US011942108B2

(12) United States Patent
Ogita et al.

(10) Patent No.: US 11,942,108 B2
(45) Date of Patent: Mar. 26, 2024

(54) INFORMATION PROCESSING APPARATUS AND INFORMATION PROCESSING METHOD

(71) Applicant: SONY GROUP CORPORATION, Tokyo (JP)

(72) Inventors: Takeshi Ogita, Tokyo (JP); Ryo Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 33 days.

(21) Appl. No.: 17/754,181

(22) PCT Filed: Sep. 18, 2020

(86) PCT No.: PCT/JP2020/035400

§ 371 (c)(1),
(2) Date: Mar. 25, 2022

(87) PCT Pub. No.: WO2021/065560

PCT Pub. Date: Apr. 8, 2021

(65) Prior Publication Data

US 2022/0293126 A1 Sep. 15, 2022

(30) Foreign Application Priority Data

Oct. 4, 2019 (JP) ................................ 2019-183474

(51) Int. Cl.
*G10L 25/78* (2013.01)
*G10L 25/18* (2013.01)

(52) U.S. Cl.
CPC .............. *G10L 25/78* (2013.01); *G10L 25/18* (2013.01); *G10L 2025/783* (2013.01)

(58) Field of Classification Search
CPC .... G10L 25/78; G10L 25/18; G10L 2025/783
See application file for complete search history.

(56) References Cited

U.S. PATENT DOCUMENTS 9,870,719 B1 * 1/2018 Watkins .................. G10L 25/21
2012/0243676 A1 * 9/2012 Beaucoup ............. H04M 9/082
379/406.06

(Continued)

FOREIGN PATENT DOCUMENTS

JP 10-000214 A 1/1998
JP 2000-245000 A 9/2000

(Continued)

OTHER PUBLICATIONS

International Search Report and Written Opinion of PCT Application No. PCT/JP2020/035400, dated Dec. 1, 2020, 11 pages of ISRWO.

*Primary Examiner* — Sonia L Gay
(74) *Attorney, Agent, or Firm* — CHIP LAW GROUP

(57) ABSTRACT

The present technology relates to an information processing apparatus, an information processing method, and a program which can curb occurrence of howling at the time of outputting vibration in response to an input sound. The information processing apparatus of one aspect of the present technology is an apparatus that generates, at the time of outputting vibration in response to an input sound from the outside, a vibration signal representing the vibration having a frequency different from a frequency of the input sound. The present technology can be applied to, for example, smartphones, smart watches, wearable apparatuses, cushions, and music experience apparatuses that vibrate in response to input sounds.

17 Claims, 19 Drawing Sheets

(56) References Cited

U.S. PATENT DOCUMENTS

| | | | | |
|---|---|---|---|---|
| 2012/0306631 | A1* | 12/2012 | Hughes | H04M 19/047 340/407.1 |
| 2016/0150338 | A1* | 5/2016 | Kim | G08B 1/08 381/58 |
| 2017/0136354 | A1 | 5/2017 | Yamano et al. | |
| 2018/0084362 | A1* | 3/2018 | Zhang | H04R 3/00 |
| 2019/0227628 | A1* | 7/2019 | Rand | G06F 3/167 |
| 2020/0389730 | A1* | 12/2020 | Hashimoto | H04R 3/00 |

FOREIGN PATENT DOCUMENTS

| | | | |
|---|---|---|---|
| JP | 2001-095098 | A | 4/2001 |
| JP | 2002-064895 | A | 2/2002 |
| JP | 2009-094561 | A | 4/2009 |
| JP | 2015-231098 | A | 12/2015 |
| WO | 2015/186394 | A1 | 12/2015 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/035400 filed on Sep. 18, 2020, which claims priority benefit of Japanese Patent Application No. JP 2019-183474 filed in the Japan Patent Office on Oct. 4, 2019. Each of the above-referenced applications is hereby incorporated herein by reference in its entirety.

TECHNICAL FIELD

The present technology relates to an information processing apparatus, an information processing method, and a program, and particularly, to an information processing apparatus, an information processing method, and a program which can curb occurrence of howling at the time of outputting vibration in response to an input sound.

BACKGROUND ART

In daily life, many apparatuses and means are used to notify of information through sounds such as a sound of a microwave oven for notification of completion of cooking, a ringing tone of an intercom, and a sound of crying of an infant (baby).

Under such circumstances, it is difficult for people with hearing impairment to notice a notification by sound. Conventionally, with respect to such a problem, a technology for converting a sound input to a microphone into vibration and outputting the vibration has been proposed (refer to PTL 1, for example).

CITATION LIST

Patent Literature

[PTL 1]
JP 2000-245000 A

SUMMARY

Technical Problem

In the technology described in PTL 1, since a vibration device vibrates and, at the same time, emits a vibration sound although it is small, the vibration sound is input to a microphone. In this case, howling may occur due to output of vibration corresponding to the input sound.

In view of such circumstances, the present technology makes it possible to curb occurrence of howling at the time of outputting vibration in response to an input sound.

Solution to Problem

An information processing apparatus of one aspect of the present technology includes a signal processing unit that generates, when vibration in response to an external input sound is output, a vibration signal representing the vibration having a frequency different from a frequency of the input sound.

In an information processing method of one aspect of the present technology, when vibration in response to an external input sound is output, an information processing apparatus generates a vibration signal representing the vibration having a frequency different from a frequency of the input sound.

In the information processing apparatus of one aspect of the present technology, when vibration in response to an external input sound is output, a vibration signal representing the vibration having a frequency different from the frequency of the input sound is generated.

DESCRIPTION OF EMBODIMENTS

Figure 1:
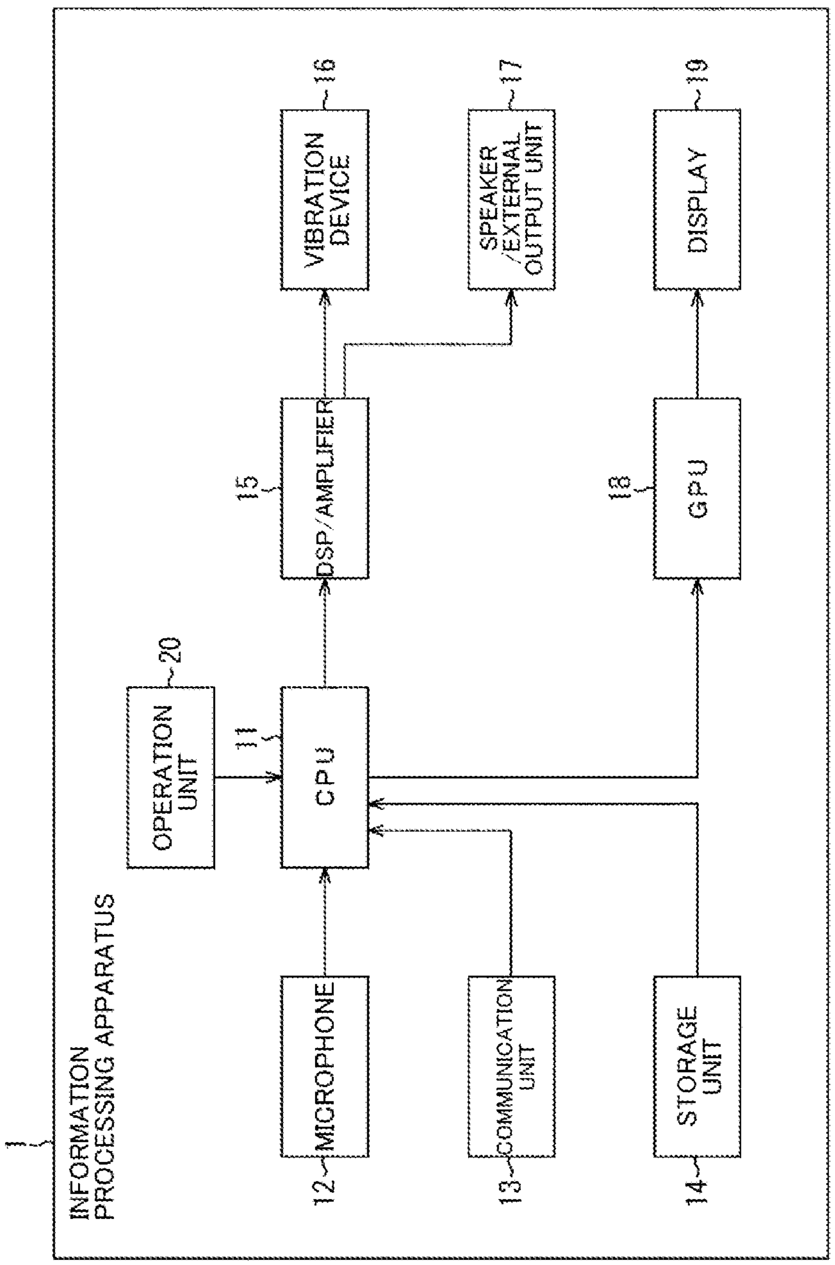
FIG. 1 is a block diagram showing a configuration example of an information processing apparatus according to an embodiment of the present technology.

Hereinafter, modes for carrying out the present technology will be described. The description will be made in the following order.

1. First signal processing
2. Second signal processing
3. Operation of information processing apparatus
4. Example of notifying of calling of user through vibration
5. Example of performing noise cancellation
6. Example of performing notification through vibration until user notices
7. Other embodiments
8. Modified examples

1. First Signal Processing

FIG. 1 is a block diagram showing a configuration example of an information processing apparatus according to an embodiment of the present technology.

The information processing apparatus 1 shown in FIG. 1 receives an environmental sound as an input sound and vibrates in response to the input sound. When the information processing apparatus 1 is composed of, for example, a smartphone, a hearing-impaired user can notice a notification by a sound such as a sound of a microwave oven or a sound of crying of a baby by perceiving vibration output from the smartphone carried by the user.

As shown in FIG. 1, the information processing apparatus 1 includes a central processing unit (CPU) 11, a microphone 12, a communication unit 13, a storage unit 14, a DSP/amplifier 15, a vibration device 16, a speaker/external output unit 17, a graphics processing unit (GPU) 18, a display 19, and an operation unit 20.

The CPU 11 serves as a control unit and controls the overall operation in the information processing apparatus 1 according to various programs. The CPU 11 applies predetermined signal processing to a sound signal of an input sound supplied from the microphone 12 and supplies a sound signal and a vibration signal obtained by the predetermined signal processing to the DSP/amplifier 15. The CPU 11 appropriately acquires information necessary for signal processing from the storage unit 14.

The vibration signal is a signal including information representing characteristics such as the amplitude and frequency of vibration output from the vibration device 16. In addition, the CPU 11 processes image data corresponding to an image such as a still image or a moving image and supplies the image data to the GPU 18.

The microphone 12 is an input device that collects external environmental sounds as input sounds and converts the sounds into sound signals. The microphone 12 supplies sound signals of input sounds to the CPU 11.

The communication unit 13 is a wireless communication interface that conforms to a predetermined standard. The communication unit 13 communicates with external devices. For example, the communication unit 13 receives a sound signal from an external device and supplies the sound signal to the CPU 11.

The storage unit 14 is composed of a random access memory (RAM), a magnetic storage device, a semiconductor storage device, an optical storage device, a magnetooptical storage device, and the like. Information used for signal processing by the CPU 11 is stored in the storage unit 14.

The DSP/amplifier 15 has a function of applying predetermined processing to a signal and amplifying the signal. The DSP/amplifier 15 amplifies a signal supplied from the CPU 11 and supplies the amplified signal to a corresponding output device. For example, the DSP/amplifier 15 amplifies the sound signal and supplies the amplified sound signal to the speaker/external output unit 17. Further, the DSP/amplifier 15 amplifies the vibration signal and supplies the amplified vibration signal to the vibration device 16. Meanwhile, at least a part of signal processing performed by the CPU 11 may be executed by the DSP/amplifier 15.

The vibration device 16 presents vibration to a vibration presentation target. The vibration presentation target may be any target such as a person, an animal, or a robot. In the following description, the vibration presentation target will be assumed to be a user (person). The vibration device 16 presents vibration to a user who comes into contact with the vibration device 16. For example, the vibration device 16 presents vibration to a hand of a user holding the information processing apparatus 1. The vibration device 16 vibrates on the basis of the vibration signal supplied from the DSP/amplifier 15.

The speaker/external output unit 17 is a device that outputs sounds. The speaker/external output unit 17 is composed of a speaker, a headphone, an earphone, and the like. The speaker/external output unit 17 outputs a sound based on the sound signal supplied from the DSP/amplifier 15.

The GPU 18 serves as an image processing device and performs processing such as drawing a screen to be displayed on the display 19. The GPU 18 processes the image data supplied from the CPU 11 and supplies the processed image data to the display 19.

The display 19 is a device that outputs images such as still images and moving images. The display 19 is composed of, for example, a liquid crystal display device, an EL display device, a laser projector, an LED projector, or a lamp. The display 19 outputs and displays an image based on the image data supplied from the GPU 18.

The operation unit 20 is composed of buttons, a touch panel, and the like. The operation unit 20 receives various operations performed by the user and supplies operation signals representing details of operations of the user to the CPU 11.

Figure 2:
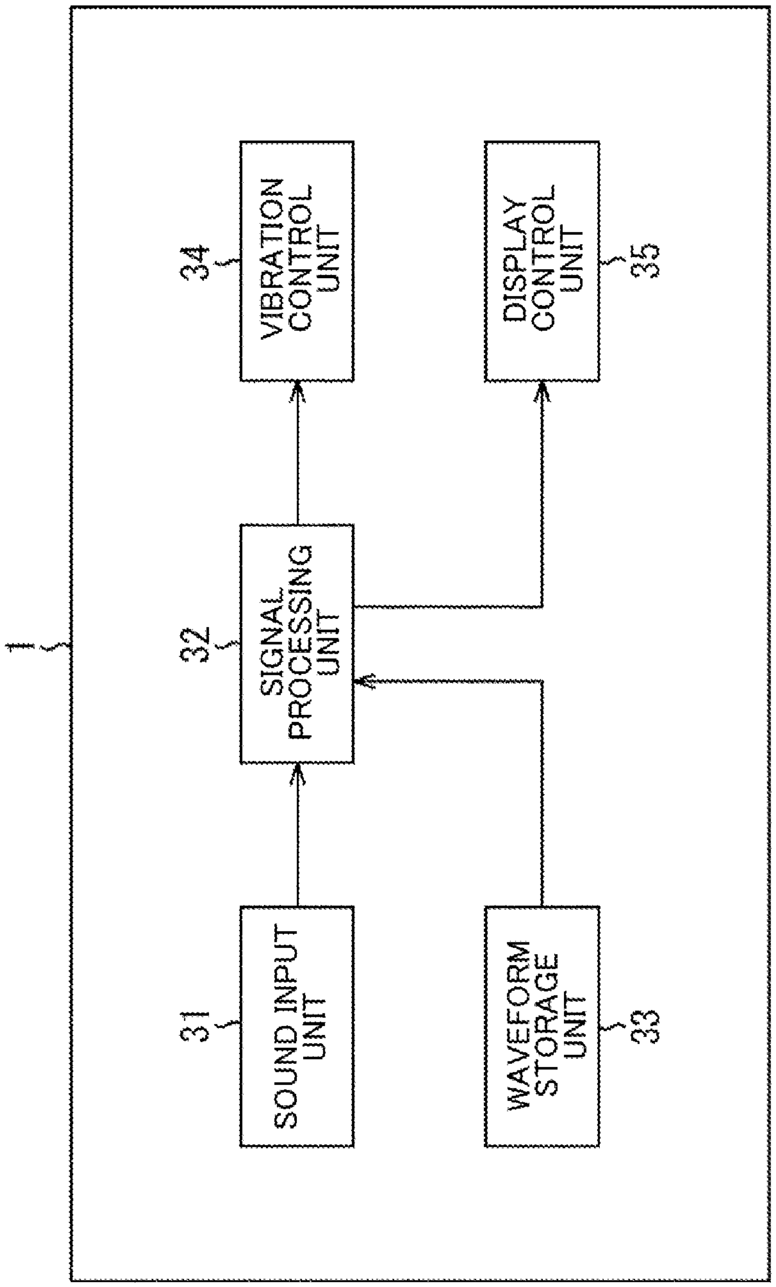
FIG. 2 is a block diagram showing a functional configuration example of the information processing apparatus.

FIG. 2 is a block diagram illustrating a functional configuration example of the information processing apparatus 1. At least some functional units shown in FIG. 2 are realized by the CPU 11 of FIG. 1 executing a predetermined program.

As shown in FIG. 2, the information processing apparatus 1 includes a sound input unit 31, a signal processing unit 32, a waveform storage unit 33, a vibration control unit 34, and a display control unit 35.

The sound input unit 31 controls the microphone 12 of FIG. 1, acquires sound signals of input sounds, and supplies the sound signals to the signal processing unit 32.

The signal processing unit 32 applies predetermined signal processing to the sound signals of the input sounds supplied from the sound input unit 31 to convert the sound signals into vibration signals. Specifically, the signal processing unit 32 generates a vibration signal representing vibration having a frequency different from the frequency of a target sound included in the input sounds. The target sound is a sound that is a target (target of vibration) that generates vibration among the input sounds. For example, a sound for performing notification to the user, such as a sound of a microwave oven or a sound of crying of a baby, is set in advance as a target sound.

For signal processing of a sound signal, a fixed frequency signal which is a signal having a vibration waveform set in advance for each target sound can be used. Information representing fixed frequency signals is stored in the waveform storage unit 33 and is appropriately acquired by the signal processing unit 32. Information representing a fixed frequency signal for each of various target sounds such as a sound of a microwave oven and a sound of crying of a baby is prepared in the waveform storage unit 33. The waveform storage unit 33 is realized by, for example, the storage unit 14 of FIG. 1.

The signal processing unit 32 supplies the vibration signals obtained by converting the sound signals to the vibration control unit 34.

Further, the signal processing unit 32 determines the type of the target sound included in the input sounds on the basis of the sound signals of the input sounds. The signal processing unit 32 supplies information representing the type of the target sound included in the input sounds to the display control unit 35.

The vibration control unit 34 controls and vibrates the vibration device 16 of FIG. 1 on the basis of the vibration signals supplied from the signal processing unit 32. As a result, the information processing apparatus 1 outputs vibration corresponding to the target sound.

The display control unit 35 causes the display 19 of FIG. 1 to display an image showing the type of the target sound represented by the vibration output by the information processing apparatus 1 on the basis of the information supplied from the signal processing unit 32.

Figure 3:
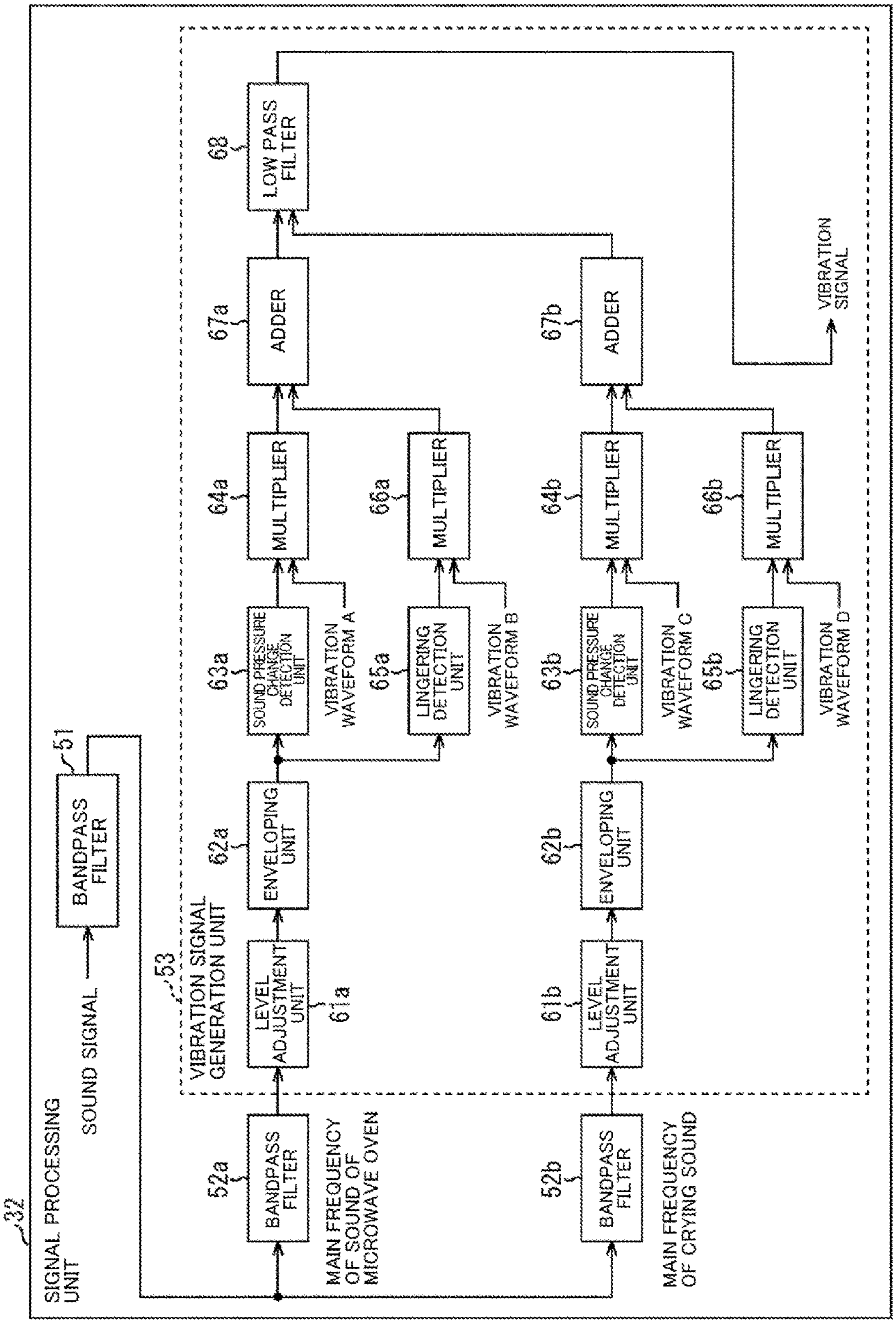
FIG. 3 is a block diagram showing a functional configuration example of a signal processing unit.

FIG. 3 is a block diagram showing a functional configuration example of the signal processing unit 32.

As shown in FIG. 3, the signal processing unit 32 includes a bandpass filter 51, bandpass filters 52*a* and 52*b*, and a vibration signal generation unit 53.

The sound signals of the input sounds are supplied to the bandpass filter 51. The bandpass filter 51 extracts sound signals in frequency bands that are difficult for the user to hear (based on characteristics of the user) from the sound signals of the input sounds. The frequency bands that are difficult for the user to hear are registered in advance by the user.

Figure 4:
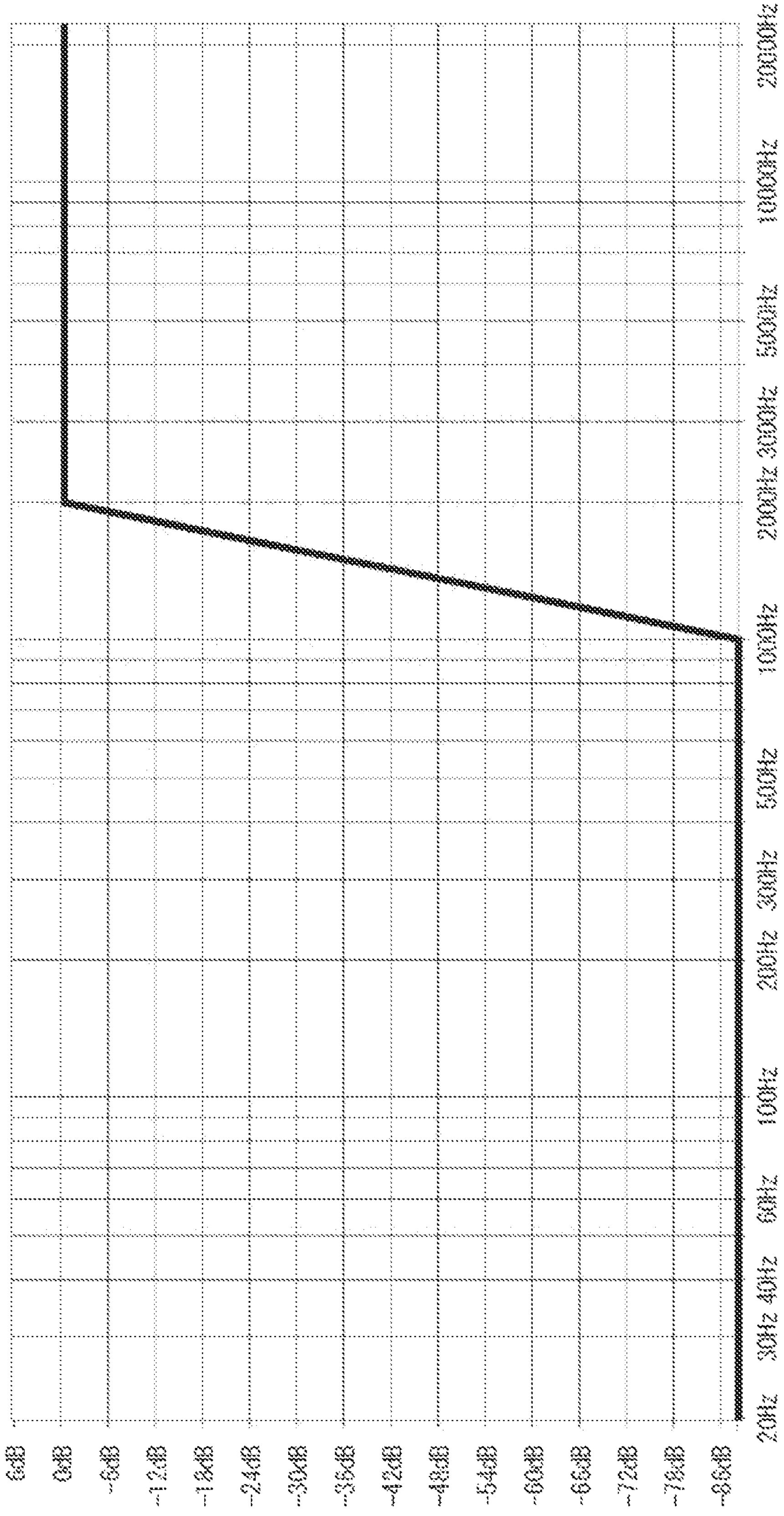
FIG. 4 is a diagram showing an example of a frequency band extracted by a bandpass filter.

FIG. 4 is a diagram showing an example of a frequency band extracted by the bandpass filter 51.

In FIG. 4, the horizontal axis represents a frequency (Hz) and the vertical axis represents a gain (dB). When a sound of 2000 Hz or higher is registered as a sound in a frequency band that is difficult to hear, the bandpass filter 51 removes signals in frequency bands of less than 2000 Hz and extracts signals in frequency bands of 2000 Hz or higher, for example, as shown in FIG. 4.

Sound signals extracted in this manner are supplied from the bandpass filter 51 to the bandpass filters 52*a* and 52*b* of FIG. 3.

The bandpass filters 52*a* and 52*b* serve as a determination unit for determining the type of the target sound included in the input sounds. Specifically, the bandpass filters 52*a* and 52*b* extract partial signals from the sound signals. A partial signal is a sound signal having a main frequency that is a frequency mainly included in the target sound.

For example, when a sound of a microwave oven (a sound of notification of completion of cooking) is a target sound, the bandpass filter 52*a* extracts a partial signal of the sound from the sound signals supplied from the bandpass filter 51. Further, when a sound of crying of a baby is a target sound, the bandpass filter 52*b* extracts a partial signal of the crying sound from the sound signals supplied from the bandpass filter 51.

In this manner, as many bandpass filters corresponding to target sounds set in advance as the number of target sounds are provided. Hereinafter, when it is not necessary to distinguish between the bandpass filters 52*a* and 52*b* as appropriate, they are collectively referred to as a bandpass filter 52. The number of bandpass filters 52 is arbitrary depending on the number of target sounds.

The bandpass filter 52 supplies a partial signal of the target sound extracted from the sound signals to the vibration signal generation unit 53.

The vibration signal generation unit 53 generates a vibration signal by applying vibration signal generation filter circuit processing, which is signal processing, to the partial signal.

The vibration signal generation unit 53 includes level adjustment units 61*a* and 61*b*, enveloping units 62*a*, 62*b*, sound pressure change detection units 63*a* and 63*b*, multipliers 64*a* and 64*b*, lingering detection units 65*a* and 65*b*, multipliers 66*a* and 66*b*, adders 67*a* and 67*b*, and a low pass filter 68. When it is not necessary to distinguish between the level adjustment units 61*a* and 61*b* in the following description, they are collectively referred to as a level adjustment unit 61. The same applies to other components provided in pairs.

A partial signal of a sound of a microwave oven is supplied from the bandpass filter 52*a* to the level adjustment unit 61*a*. The level adjustment unit 61*a* amplifies the amplitude of the partial signal supplied from the bandpass filter 52*a* and supplies it to the enveloping unit 62*a*.

The enveloping unit 62*a* applies enveloping processing to the partial signal supplied from the level adjustment unit 61*a*. The enveloping process is processing for extracting the external form of the amplitude of a signal. The partial signal on which enveloping processing has been performed is supplied to the sound pressure change detection unit 63*a* and the lingering detection unit 65*a*.

The sound pressure change detection unit 63*a* applies sound pressure change detection processing to the partial signal supplied from the enveloping unit 62*a*. The sound pressure change detection processing is processing for extracting an attack sound from a sound signal. The attack sound is a rising sound.

As the sound pressure change detection processing, for example, the same processing as beat extraction processing described in Japanese Patent No. 4467601 may be used. Briefly, the sound pressure change detection unit 63*a* calculates spectra of sound signals of input sounds at each time and calculates time derivative values of the spectra per unit time. The sound pressure change detection unit 63*a* compares peak values of waveforms of the time derivative values of the spectra with a predetermined threshold value and extracts a waveform having a peak that exceeds the threshold value as an attack sound component. The extracted attack sound component includes information on a timing of an attack sound and the intensity of the attack sound at that time. The sound pressure change detection unit 63*a* applies an envelope to the extracted attack sound component to generate an attack sound signal having a waveform in which the attack sound signal rises at the timing of the attack sound and attenuates at a rate lower than a rising rate.

The attack sound signal extracted by applying sound pressure change detection processing is supplied to the multiplier 64*a*.

The multiplier 64*a* acquires a signal having a vibration waveform A from the waveform storage unit 33 of FIG. 2. The vibration waveform A is a waveform of a fixed frequency signal associated in advance with the attack sound of the sound of the microwave oven. The signal having the vibration waveform A is a vibration signal having a frequency different from the frequency of the input sound of the microwave oven.

Here, respective fixed frequency signals are associated in advance with the attack sound of the target sound and a lingering component of the target sound which will be described later. The associated fixed frequency signals are vibration signals having frequencies different from that of the target sound.

The multiplier 64*a* multiplies the attack sound signal supplied from the sound pressure change detection unit 63*a* by the signal having the vibration waveform A acquired from the waveform storage unit 33. The attack sound signal multiplied by the signal having the vibration waveform A is supplied to the adder 67*a*.

The lingering detection unit 65*a* applies lingering detection processing to the partial signal supplied from the enveloping unit 62*a*. The lingering detection processing is processing for controlling the amplitude of an output signal such that a predetermined relationship is established between the amplitude of an input signal and the amplitude of the output signal. According to lingering detection processing, for example, a lingering component in which falling of the sound has been emphasized is extracted as a lingering signal.

The lingering signal extracted by applying lingering detection processing is supplied to the multiplier 66*a*.

The multiplier 66*a* acquires a signal having a vibration waveform B from the waveform storage unit 33 of FIG. 2. The vibration waveform B is a waveform of a fixed frequency signal associated in advance with the lingering component of the sound of the microwave oven. The signal having the vibration waveform B is a vibration signal having a frequency different from the frequency of the input sound of the microwave oven.

The multiplier 66*a* multiplies the lingering signal supplied from the lingering detection unit 65*a* by the signal having the vibration waveform B acquired from the waveform storage unit 33. The lingering signal obtained by multiplying the signal having the vibration waveform B is supplied to the adder 67*a*.

The adder 67*a* combines (for example, sums) the attack sound signal supplied from the multiplier 64*a* and the lingering signal supplied from the multiplier 66*a* to generate a vibration signal. Accordingly, it is possible to add the lingering component to the attack sound. Meanwhile, the attack sound signal and the lingering signal may be respectively weighted and then combined.

The vibration signal generated by combining the attack sound signal multiplied by the signal having the vibration waveform A and the lingering signal multiplied by the signal having the vibration waveform B is a signal that represents vibration in response to the sound of the microwave oven and has a frequency different from the frequency of the input sound of the microwave oven. The vibration signal generated by combining of the adder 67*a* is supplied to the low pass filter 68.

On the other hand, a partial signal of a crying sound is supplied from the bandpass filter 52*b* to the level adjustment unit 61*b*. The level adjustment unit 61*b* amplifies the amplitude of the partial signal supplied from the bandpass filter 52*b* and supplies it to the enveloping unit 62*b*.

The enveloping unit 62*b* applies enveloping processing to the partial signal supplied from the level adjustment unit 61*b*. The partial signal on which enveloping processing has been performed is supplied to the sound pressure change detection unit 63*b* and the lingering detection unit 65*b*.

The sound pressure change detection unit 63*b* applies sound pressure change detection processing to the partial signal supplied from the enveloping unit 62*b*. The attack sound signal extracted by applying sound pressure change detection processing is supplied to the multiplier 64*b*.

The multiplier 64*b* acquires a signal having a vibration waveform C from the waveform storage unit 33 of FIG. 2. The vibration waveform C is a waveform of a fixed frequency signal associated in advance with an attack sound of the crying sound. The signal having the vibration waveform C is a vibration signal having a frequency different from the frequency of the input crying sound.

The multiplier 64*b* multiplies the attack sound signal supplied from the sound pressure change detection unit 63*b* by the signal having the vibration waveform C acquired from the waveform storage unit 33. The attack sound signal multiplied by the signal having the vibration waveform C is supplied to the adder 67*b*.

The lingering detection unit 65*b* applies lingering detection processing to the partial signal supplied from the enveloping unit 62*b*. The lingering signal extracted by applying lingering detection processing is supplied to the multiplier 66*b*.

The multiplier 66*b* acquires a signal having a vibration waveform D from the waveform storage unit 33 of FIG. 2. The vibration waveform D is a waveform of a fixed frequency signal associated in advance with a lingering component of the crying voice. The signal having the vibration waveform D is a vibration signal having a frequency different from the frequency of the input crying sound.

The multiplier 66*b* multiplies the lingering signal supplied from the lingering detection unit 65*b* by the signal having the vibration waveform D acquired from the waveform storage unit 33. The lingering signal multiplied by the signal having the vibration waveform D is supplied to the adder 67*b*.

The adder 67*b* combines (for example, sums) the attack sound signal supplied from the multiplier 64*b* and the lingering signal supplied from the multiplier 66*b* to generate a vibration signal. Meanwhile, the attack sound signal and the lingering signal may be respectively weighted and then combined.

The vibration signal generated by combining the attack sound signal multiplied by the signal having the vibration waveform C and the lingering signal multiplied by the signal having the vibration waveform D is a signal that represents vibration in response to the crying sound and has a frequency different from the frequency of the input crying sound. The vibration signal generated by combining of the adder 67*b* is supplied to the low pass filter 68.

As described above, a system composed of the level adjustment unit 61, the enveloping unit 62, the sound pressure change detection unit 63, the multiplier 64, the lingering detection unit 65, the multiplier 66, and the adder 67 for each target sound is provided in the subsequent stages of the bandpass filters 52*a* and 52*b*. A vibration signal having a frequency different from the frequency of the input target sound is supplied to the low pass filter 68 for each system of the target sound as a signal representing vibration in response to the target sound (input sound).

The low pass filter 68 generates a vibration signal in which joints between the waveforms of the attack sound and the lingering component are smoothened by performing filtering processing on the vibration signals supplied from the adders 67*a* and 67*b*. The vibration signal obtained by performing filtering processing by the low pass filter 68 is supplied to the vibration control unit 34 of FIG. 2.

For example, when the sound of the microwave oven and the crying sound are simultaneously input, a vibration signal obtaining by summing the vibration signal corresponding to the sound of the microwave oven supplied from the adder 67*a* and the vibration signal corresponding to the crying sound supplied from the adder 67*b* is supplied from the low pass filter 68 to the vibration control unit 34.

Further, although a case in which a vibration signal is generated for each of two target sound systems having a sound of a microwave oven and a sound of crying of a baby as target sounds is shown in the configuration of the signal processing unit 32 of FIG. 3, any number of target sound systems corresponding to the number of target sounds can be provided. Specifically, when further another target sound (for example, an intercom installed in a house) is handled, the same system may be provided at the rear of the bandpass filter 52 corresponding to the target sound. The number of target sounds is not limited to plural numbers and may be one and, in such a case, one bandpass filter 52 and one system are provided for one target sound.

Figure 5:
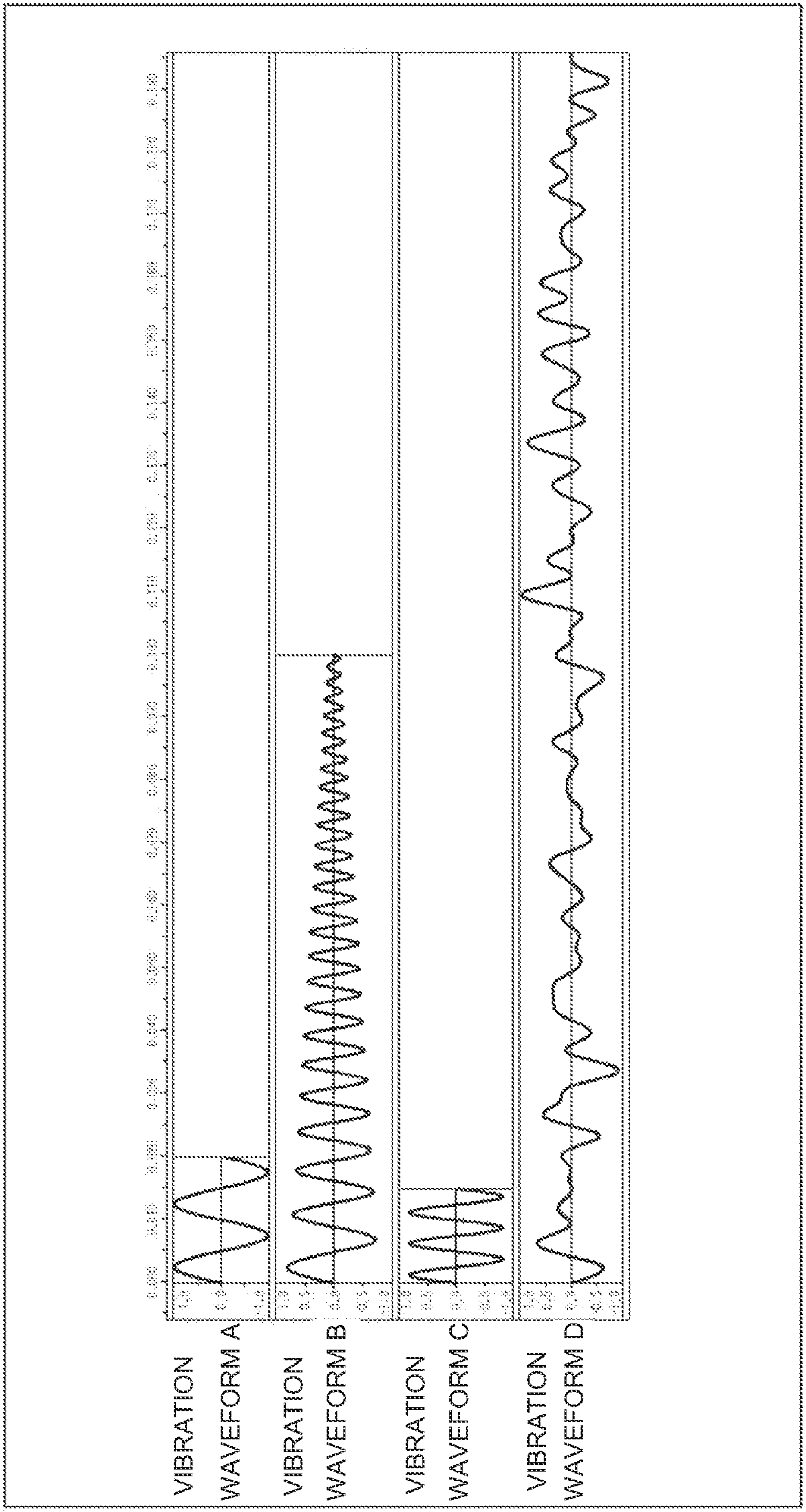
FIG. 5 is a diagram showing an example of fixed frequency signals used for signal processing.

FIG. 5 is a diagram showing an example of fixed frequency signals used for the above-described signal processing.

In each fixed frequency signal waveform shown in FIG. 5, the horizontal direction represents time and the vertical direction represents an amplitude with the center as 0. Each fixed frequency signal has an amplitude, a frequency, temporal length, and the like based on characteristics of an attack sound or a lingering component of a target sound associated therewith.

The signal having the vibration waveform A is a signal that reminds the user of an attack sound of the sound of the microwave oven. The amplitude of the signal having the vibration waveform A is constant.

The signal having the vibration waveform B is a signal that reminds the user of a lingering component of the microwave oven. The amplitude of the signal having the vibration waveform B gradually decreases with the passage of time. The signal having the vibration waveform B has a longer temporal length than that of the signal having the vibration waveform A.

The signal having the vibration waveform C is a signal that reminds the user of an attack sound of a crying sound. The amplitude of the signal having the vibration waveform C is constant. The frequency of the signal having the vibration waveform C is higher than the frequency of the signal having the vibration waveform A.

The signal having the vibration waveform D is a signal that reminds the user of a lingering component of the crying sound. The amplitude of the signal having the vibration waveform D varies from time to time. The signal having the vibration waveform D has a longer temporal length than that of the vibration waveform C.

As described above, the information processing apparatus 1 can curb occurrence of howling at the time of outputting vibration in response to an input sound (target sound) by shifting the frequency of a vibration signal from the frequency of the input target sound.

2. Second Signal Processing

In the signal processing unit 32 of FIG. 2, a vibration signal having a frequency different from the frequency of the original target sound may be generated using a signal obtained by shifting the frequency of the target sound.

Figure 6:
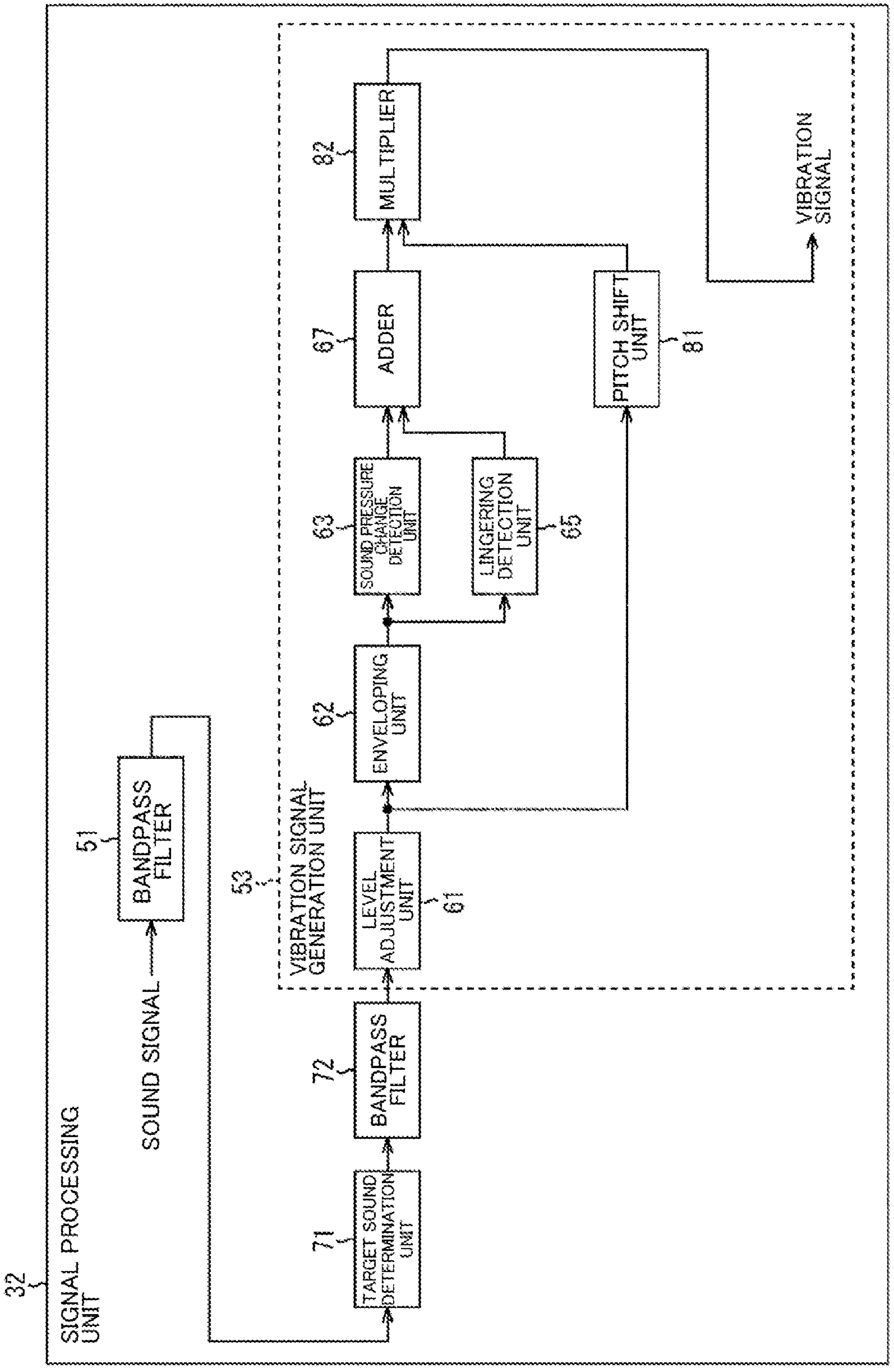
FIG. 6 is a block diagram showing another functional configuration example of the signal processing unit.

FIG. 6 is a block diagram showing another functional configuration example of the signal processing unit 32.

In FIG. 6, the same components as those of the signal processing unit 32 of FIG. 3 are denoted by the same reference numerals. Redundant description will be appropriately omitted.

A target sound determination unit 71 and a bandpass filter 72 are provided between the bandpass filter 51 and the vibration signal generation unit 53 described with reference to FIG. 3 in the signal processing unit 32 shown in FIG. 6.

A sound signal in a frequency band that is difficult for the user to hear is supplied to the target sound determination unit 71 from the bandpass filter 51. The target sound determination unit 71 determines the type of a target sound included in the sound signal on the basis of sound data of the target sound registered in advance. Information representing the determined type of the target sound and the sound signal are supplied to the bandpass filter 72.

The bandpass filter 72 extracts a partial signal of the target sound from the sound signal supplied from the target sound determination unit 71 on the basis of the information supplied from the target sound determination unit 71.

Figure 7:
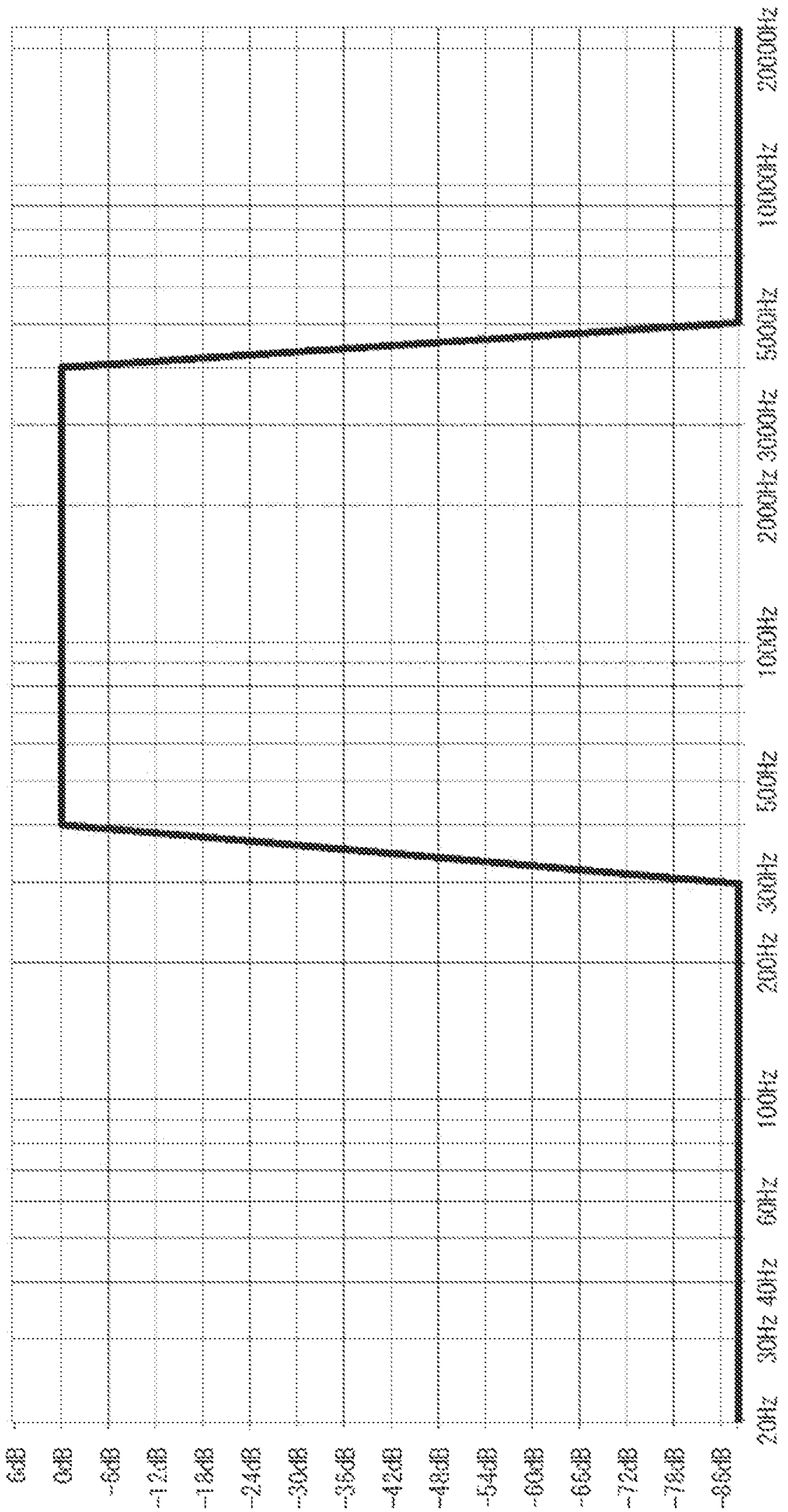
FIG. 7 is a diagram showing an example of a frequency band extracted by a bandpass filter.

FIG. 7 is a diagram showing an example of a frequency band extracted by the bandpass filter 72.

In FIG. 7, the horizontal axis represents a frequency (Hz) and the vertical axis represents a gain (dB). When the main frequency of the target sound falls between 400 Hz and 4000 Hz, for example, the bandpass filter 72 removes signals in frequency bands below 400 Hz and signals in frequency bands over 4000 Hz and extract signals in the frequency band of 400 Hz to 4000 Hz, as shown in FIG. 7.

A partial signal extracted in this manner is supplied from the bandpass filter 72 to the vibration signal generation unit 53 of FIG. 6.

The vibration signal generation unit 53 shown in FIG. 6 includes a pitch shift unit 81 and a multiplier 82 in addition to the level adjustment unit 61, the enveloping unit 62, the sound pressure change detection unit 63, the lingering detection unit 65, and the adder 67 described with reference to FIG. 3. The vibration signal generation unit 53 shown in FIG. 6 is provided with only one system for performing various types of processing on sound signals supplied from the bandpass filter 72.

An attack sound signal is supplied to the adder 67 from the sound pressure change detection unit 63, and a lingering signal is supplied thereto from the lingering detection unit 65. The adder 67 combines the attack sound signal supplied from the sound pressure change detection unit 63 and the lingering signal supplied from the lingering detection unit 65 to generate a combined signal. The combined signal generated by the adder 67 is supplied to the multiplier 82.

The same partial signal as the partial signal supplied to the enveloping unit 62 is supplied to the pitch shift unit 81 from the level adjustment unit 61. The pitch shift unit 81 applies pitch shift processing for shifting a frequency to the partial signal. The frequency of the partial signal is shifted to a frequency that is a fraction of the frequency of the input target sound according to pitch shift processing.

For example, when the main frequency of the target sound falls between 400 Hz and 4000 Hz, the pitch shift unit 81 shifts the frequency of the partial signal to 40 Hz to 400 Hz. The frequency of the partial signal may be shifted in accordance with the frequency band of vibration that can be perceived by persons. For example, the frequency of the partial signal is shifted to be 500 Hz to 700 Hz or less.

The pitch shift unit 81 may shift the frequency of the partial signal to a frequency band that is not included in the input sound on the basis of a result of analysis of the frequency band of the input sound.

The partial signal on which pitch shift processing has been applied is supplied to the multiplier 82.

The multiplier 82 multiplies the combined signal supplied from the adder 67 by the partial signal on which pitch shift processing has been applied, supplied from the pitch shift unit 81, to generate a vibration signal. The vibration signal generated by the multiplier 82 is supplied to the vibration control unit 34 of FIG. 2.

As described above, the information processing apparatus 1 can curb occurrence of howling at the time of outputting vibration in response to an input sound (target sound) by shifting the frequency of a vibration signal from the frequency of the input target sound.

3. Operation of Information Processing Apparatus

Here, an operation of the information processing apparatus 1 having the above-described configuration will be described.

First, processing of the information processing apparatus 1 will be described with reference to the flowchart of FIG. 8.

Figure 8:
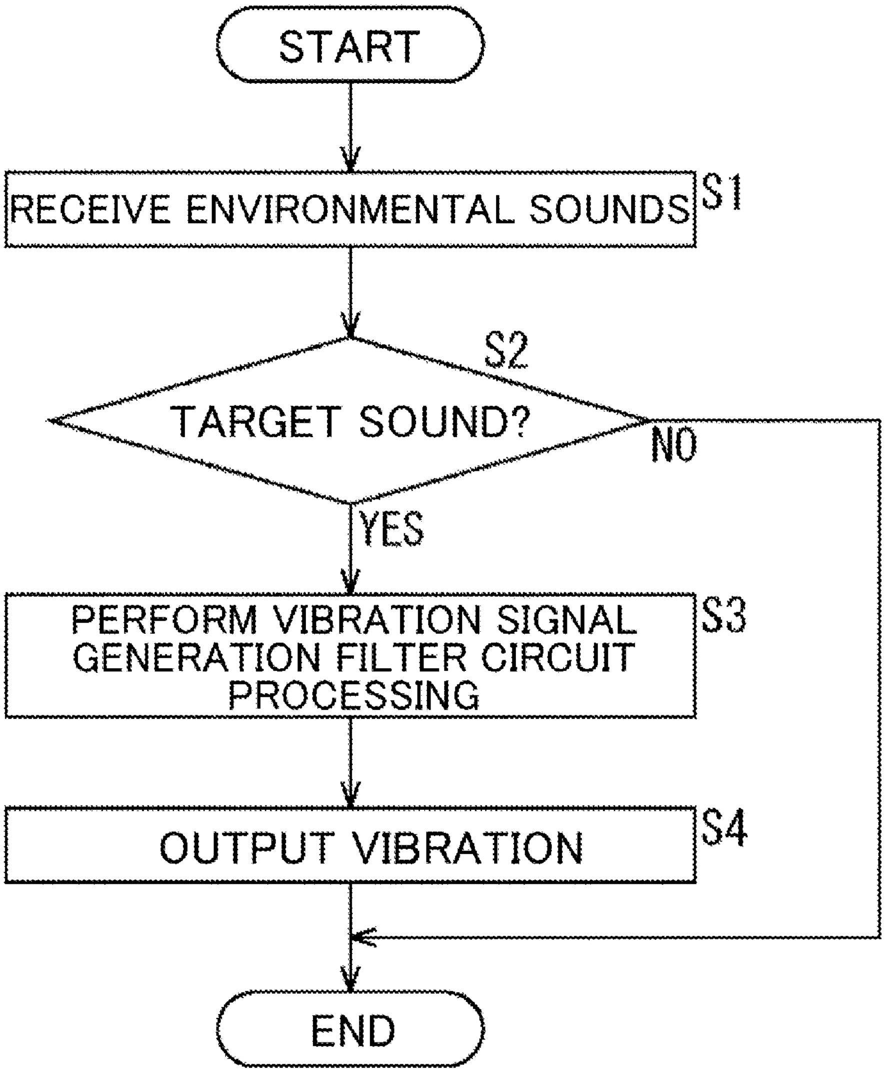
FIG. 8 is a flowchart illustrating processing of the information processing apparatus.

Processing shown in FIG. 8 is performed using the configuration of the signal processing unit 32 described with reference to FIG. 3 or the configuration of the signal processing unit 32 described with reference to FIG. 6.

In step S1, the sound input unit 31 receives environmental sounds and acquires sound signals of input sounds.

In step S2, the signal processing unit 32 determines whether or not a target sound is included in the input sounds.

If it is determined that the target sound is not included in the input sounds in step S1, processing ends.

On the other hand, if it is determined that the target sound is included in the input sounds in step S1, a partial signal of the target sound is extracted from the input sounds, and processing proceeds to step S3.

In step S3, the vibration signal generation unit 53 applies vibration signal generation filter circuit processing to the partial signal to generate a vibration signal.

In step S4, the vibration control unit 34 controls the vibration device 16 on the basis of the vibration signal to output (generate) vibration.

As described above, the information processing apparatus 1 can curb occurrence of howling at the time of outputting vibration in response to an input sound (target sound) by shifting the frequency of a vibration signal from the frequency of the input target sound.

In the information processing apparatus 1, the name of the target sound included in the input sounds may be displayed on the display 19.

Figure 9:
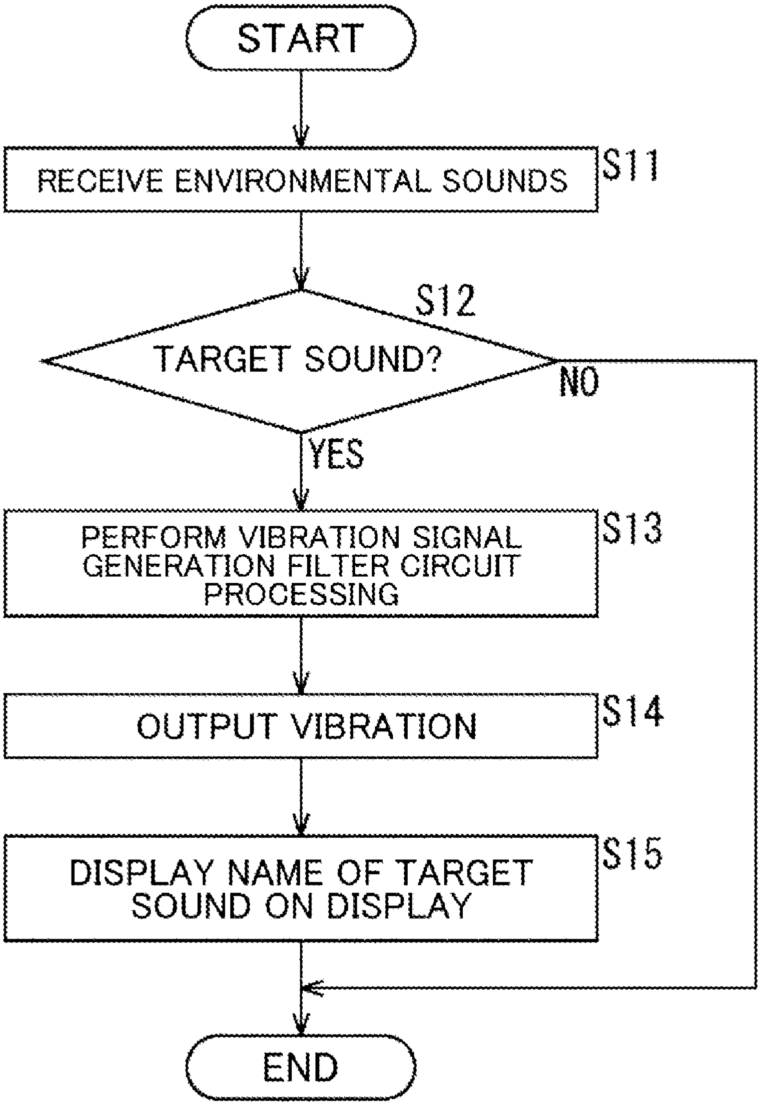
FIG. 9 is a flowchart illustrating processing of an information processing apparatus that displays the type of a target sound.

Processing of the information processing apparatus 1 that displays the type of the target sound on the display 19 will be described with reference to the flowchart of FIG. 9.

Processing of steps S11 to S14 is the same as processing of steps S1 to S4 of FIG. 8. That is, a vibration signal in response to an input sound is generated and vibration is output on the basis of the vibration signal.

When processing of step S14 ends, processing proceeds to step S15. In step S15, the display control unit 35 causes the display 19 to display the name of the target sound.

As described above, the user can confirm the name of the target sound notified of by the information processing apparatus 1 through vibration by viewing an image displayed on the display 19.

Meanwhile, display on the display 19 is an example of a method of presenting information such as the name of the target sound to the user, and other presentation methods may be used. For example, a light emitting device provided in the information processing apparatus 1 may emit light through a method depending on the type of the target sound to notify the user of the type of the target sound. Further, a device provided in the information processing apparatus 1 may output an odor depending on the type of the target sound to notify the user of the type of the target sound.

4. Example of Notifying of Calling of User Through Vibration

A voice calling the user of the information processing apparatus 1 may be set as a target sound and the information processing apparatus 1 may vibrate in response to the voice calling the user.

Figure 10:
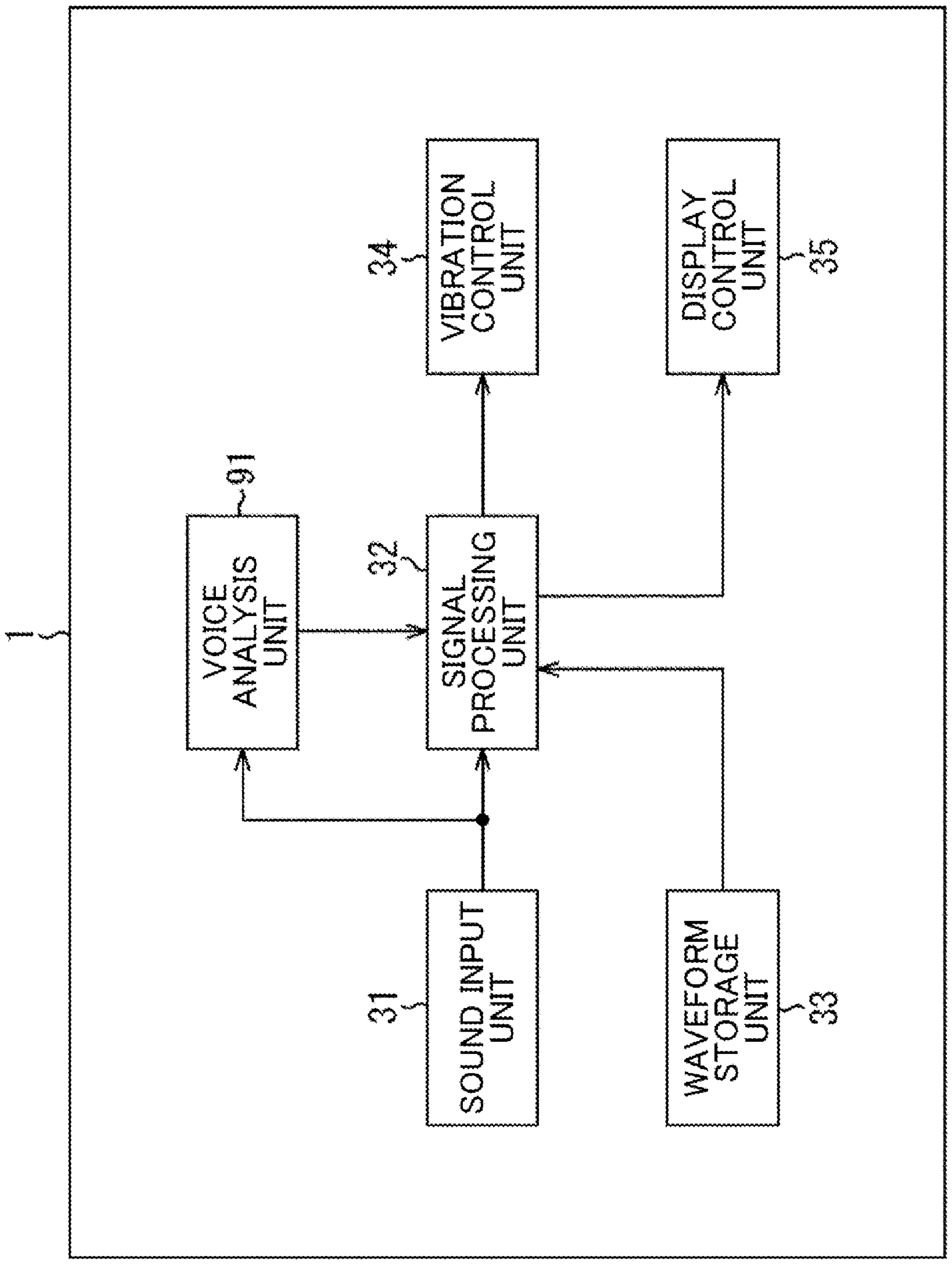
FIG. 10 is a block diagram showing a functional configuration example of an information processing apparatus that vibrates in response to a sound of calling a user.

FIG. 10 is a block diagram showing a functional configuration example of the information processing apparatus 1 that vibrates in response to the voice calling the user.

In FIG. 10, the same components as those of the information processing apparatus 1 in FIG. 2 are designated by the same reference numerals. Redundant description will be appropriately omitted.

In the information processing apparatus 1 shown in FIG. 10, a voice analysis unit 91 is provided in addition to the sound input unit 31, the signal processing unit 32, the waveform storage unit 33, the vibration control unit 34, and the display control unit 35 described with reference to FIG. 2.

The same sound signals as the sound signals of the input sounds supplied to the signal processing unit 32 are supplied to the voice analysis unit 91 from the sound input unit 31. The voice analysis unit 91 performs voice analysis processing on the sound signals of the input sounds supplied from the sound input unit 31. A voice contained in the input sounds is analyzed according to voice analysis processing.

For example, the voice analysis unit 91 determines whether or not the input sounds include a voice calling the user, such as a title of the user such as "mother" or the name of the user on the basis of a result of voice analysis. In the voice analysis unit 91, the title of the user, the name of the user, and the like are registered in advance. In this voice analysis processing, a known technique such as voice recognition using a statistical method can be used.

When the input sounds include the voice calling the user, the voice analysis unit 91 supplies information representing a main frequency band of the voice calling the user to the signal processing unit 32.

The signal processing unit 32 applies predetermined signal processing to the sound signals of the input sounds supplied from the sound input unit 31 on the basis of the information supplied from the voice analysis unit 91 to generate a vibration signal in response to the voice calling the user.

Figure 11:
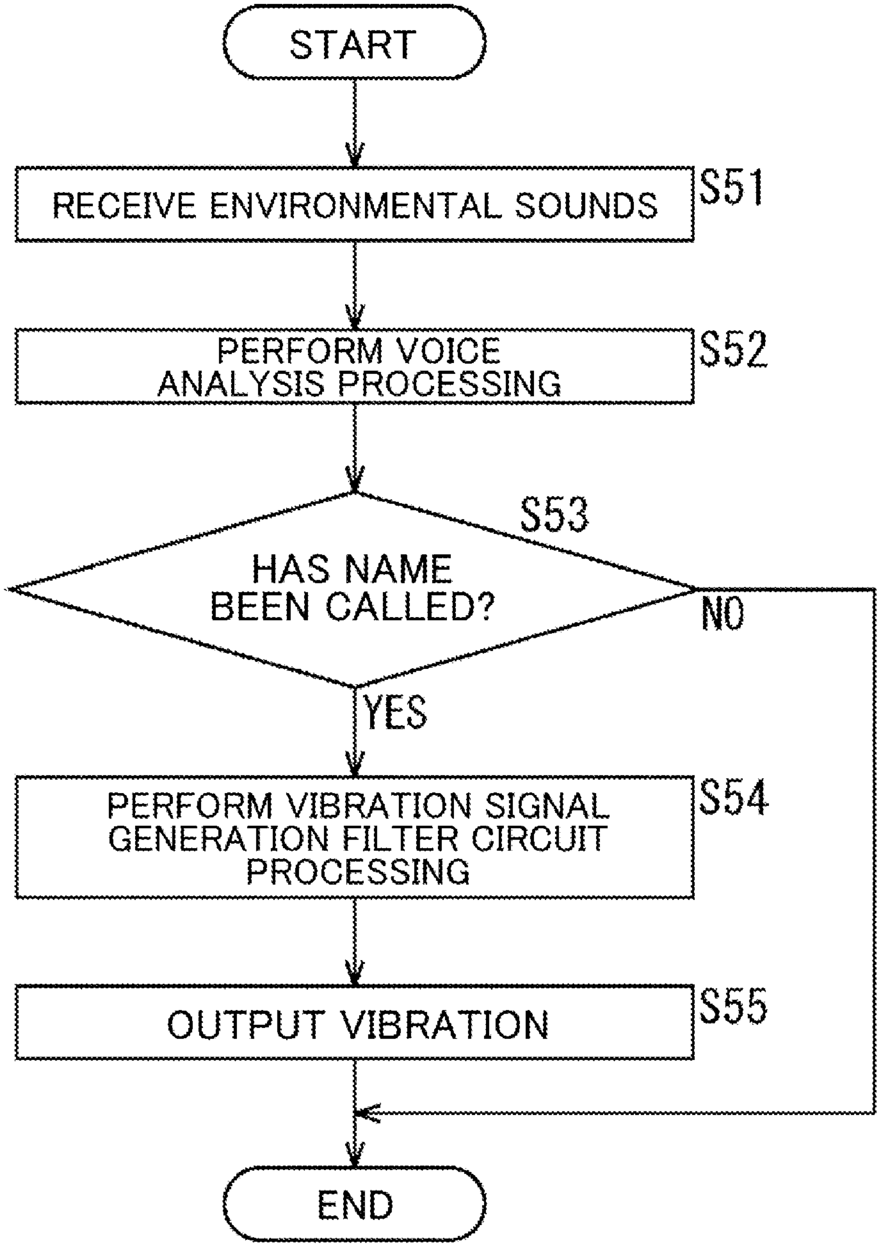
FIG. 11 is a flowchart illustrating processing of the information processing apparatus that vibrates in response to a sound of calling a user.

Here, processing performed by the information processing apparatus 1 having the above-described configuration will be described with reference to the flowchart of FIG. 11.

Processing of step S51 is the same as processing of step S1 of FIG. 8. That is, the sound signals of the input sounds are acquired.

When processing of step S51 ends, processing proceeds to step S52. In step S52, the voice analysis unit 91 performs voice analysis processing on the sound signals of the input sounds.

In step S53, the voice analysis unit 91 determines whether or not the name of the user has been called on the basis of the result of voice analysis. Here, if the input sounds include a voice calling the user, it is determined that the name of the user has been called.

If it is determined that the name of the user has not been called in step S53, processing ends.

On the other hand, if it is determined that the name of the user has been called in step S53, processing proceeds to step S54.

Processing of steps S54 and S55 is the same as processing of steps S3 and S4 of FIG. 8. That is, a vibration signal in response to an input sound is generated and vibration is output on the basis of the vibration signal.

As described above, the user can notice that he/she has been called through a notification using vibration of the information processing apparatus 1.

5. Example of Performing Noise Cancellation

The information processing apparatus 1 may generate a vibration signal using a sound signal from which noises included in environmental sounds or the voice of the user has been canceled.

Figure 12:
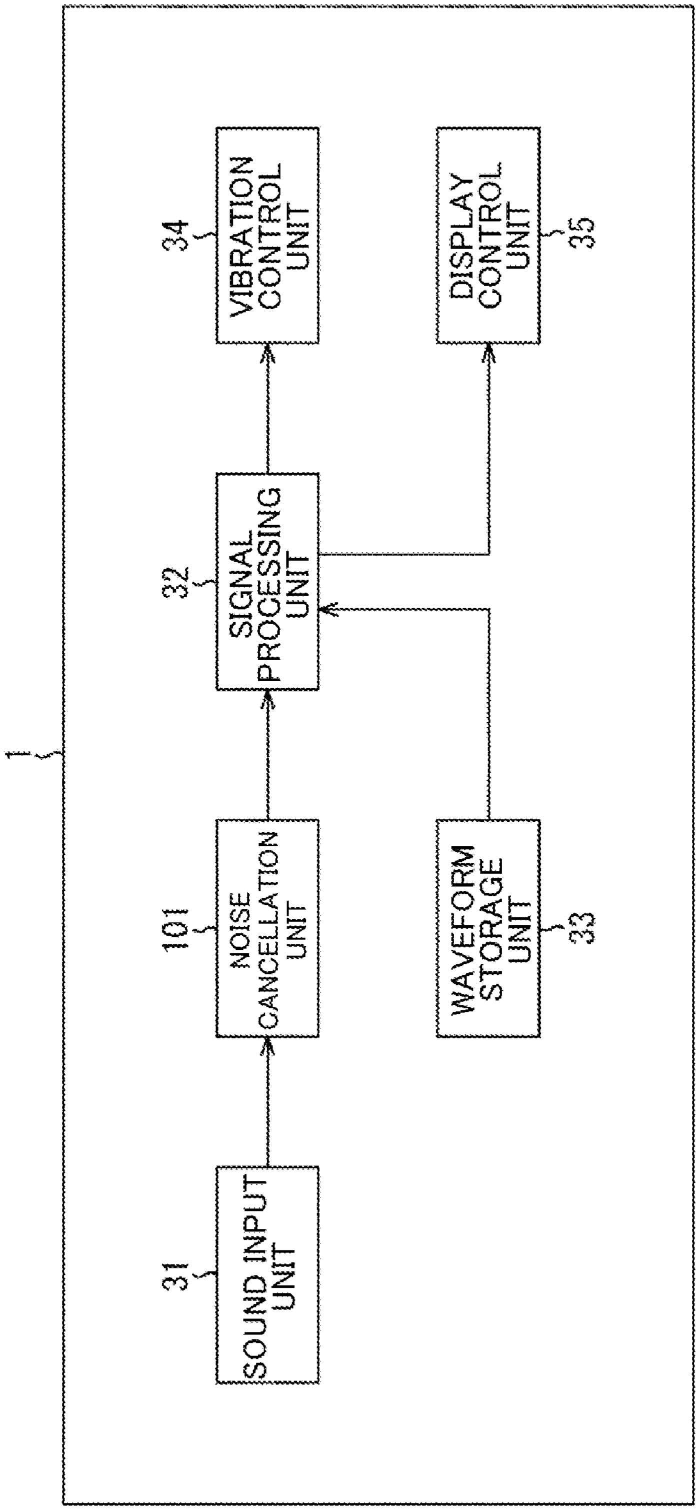
FIG. 12 is a block diagram showing a functional configuration example of an information processing apparatus that performs noise cancellation.

FIG. 12 is a block diagram showing a functional configuration example of the information processing apparatus 1 that performs noise cancellation.

In FIG. 12, the same components as those of the information processing apparatus 1 in FIG. 2 are designated by the same reference numerals. Redundant description will be appropriately omitted.

In the information processing apparatus 1 shown in FIG. 12, a noise cancellation unit 101 is provided in addition to the sound input unit 31, the signal processing unit 32, the waveform storage unit 33, the vibration control unit 34, and the display control unit 35 described with reference to FIG. 2.

Sound signals of input sounds are supplied to the noise cancellation unit 101 from the sound input unit 31. The noise cancellation unit 101 cancels signals in the frequency band of the voice of the user from the sound signals of the input sounds. Further, the noise cancellation unit 101 cancels signals in frequency bands of noises in which sounding occurs all the time from the sound signals of the input sounds.

Cancellation of signals in the frequency bands of the voice of the user and noises is performed by, for example, a bandpass filter that cuts the frequency bands of the voice of the user and the noises. The voice of the user and the noises are extracted, and the signals in the frequency bands of the voice of the user and the noises may be canceled by adding sound signals having opposite phases of the voice of the user and the noises to the sound signals of the input sounds.

The sound signals of the input sounds from which the signals in the frequency bands of the voice of the user and the noises have been canceled by the noise cancellation unit 101 is supplied to the signal processing unit 32.

The signal processing unit 32 generates a vibration signal in response to the input sounds by applying predetermined signal processing to the sound signals of the input sounds supplied from the noise cancellation unit 101.

Figure 13:
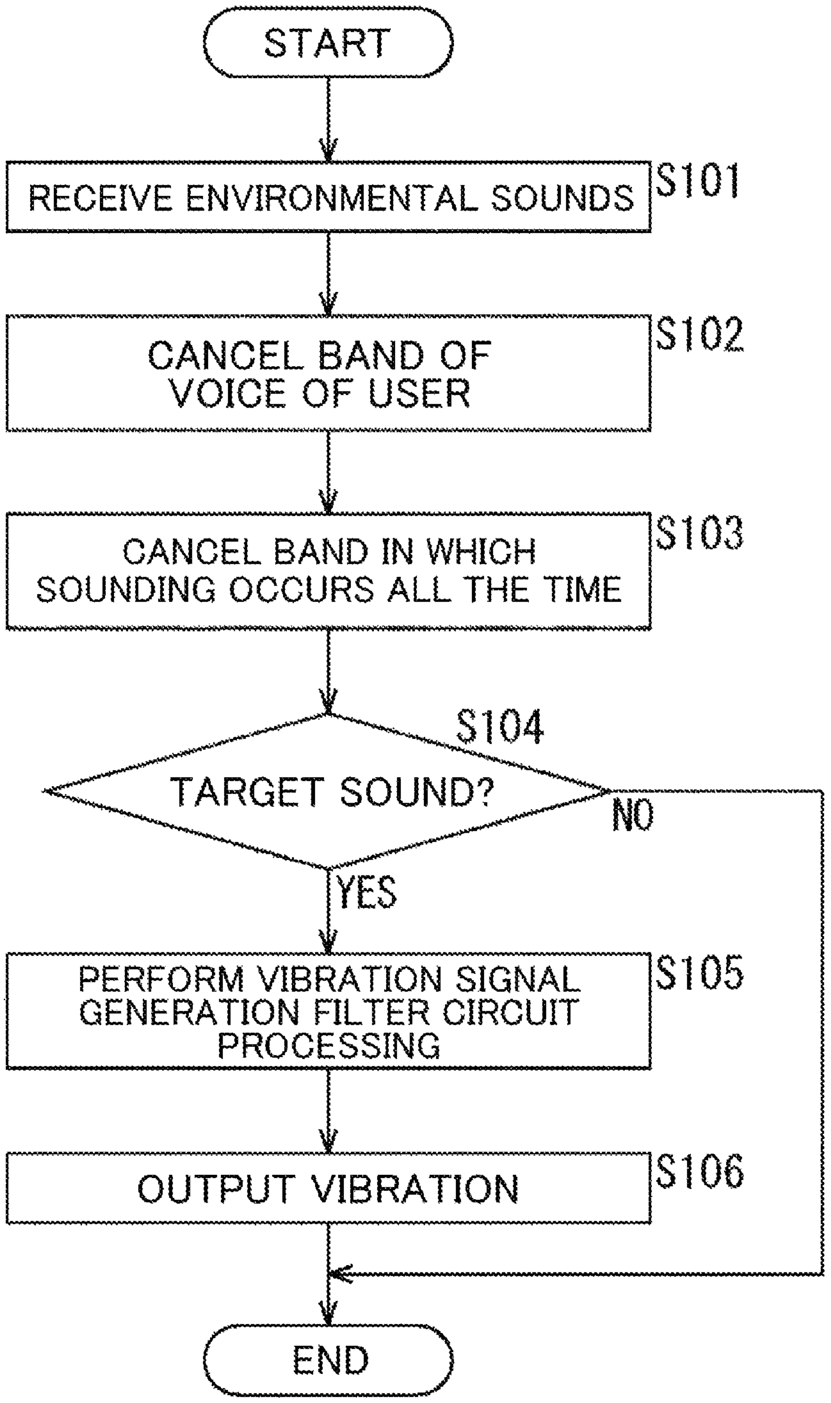
FIG. 13 is a flowchart illustrating processing of the information processing apparatus that performs noise cancellation.

Here, processing of the information processing apparatus 1 having the above-described configuration will be described with reference to the flowchart of FIG. 13.

Processing of step S101 is the same as processing of step S1 of FIG. 8. That is, the sound signals of the input sounds are acquired.

When processing of step S101 ends, processing proceeds to step S102. In step S102, the noise cancellation unit 101 cancels signals in the frequency band of the voice of the user from the sound signals of the input sounds.

In step S103, the noise cancellation unit 101 cancels signals in frequency bands of noises in which sounding occurs all the time from the sound signals of the input sounds.

Processing of steps S104 to S106 is the same as processing of steps S2 to S4 of FIG. 8. That is, a vibration signal in response to an input sound is generated and vibration is output on the basis of the vibration signal.

As described above, the information processing apparatus 1 can vibrate in response to the input sounds excluding the voice of the user and noises.

6. Example of Performing Notification Through Vibration Until User Notices

The information processing apparatus 1 may continue notification through vibration until the user performs an operation of ending the notification through vibration. The user can end the notification through vibration by operating the operation unit 20, for example.

Figure 14:
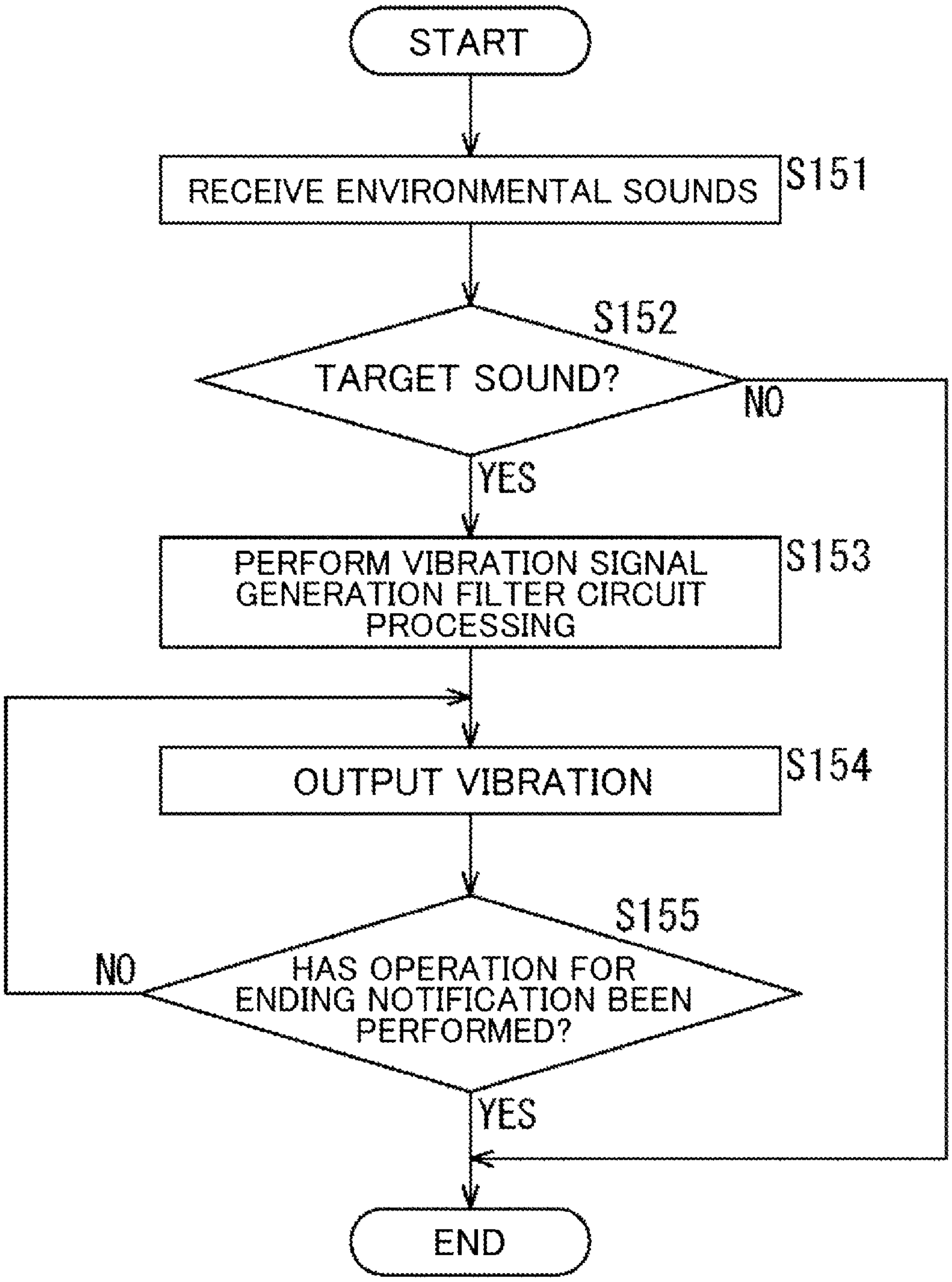
FIG. 14 is a flowchart illustrating processing of an information processing apparatus that performs notification according to vibration until a user notices.

Processing of the information processing apparatus 1 that performs notification through vibration until the user notices it will be described with reference to the flowchart of FIG. 14.

Processing of steps S151 to S154 is the same as processing of steps S1 to S4 of FIG. 3. That is, a vibration signal in response to an input sound is generated and vibration is output on the basis of the vibration signal.

When processing of step S154 ends, processing proceeds to step S155. In step S155, the vibration control unit 34 determines whether or not an operation of ending notification through vibration has been performed and continues to vibrate the vibration device 16 until it is determined that the operation of ending the notification through vibration has been performed in step S155.

Here, when a button provided on the information processing apparatus 1 is pressed, for example, the vibration control unit 34 determines that the operation of ending the notification through vibration has been performed. Further, when a touch panel provided in the information processing apparatus 1 is tapped, for example, the vibration control unit 34 determines that the operation of ending the notification through vibration has been performed. The operation of ending the notification through vibration is an arbitrary operation set in advance.

On the other hand, if it is determined that the operation of ending the notification through vibration has been performed in step S155, processing ends.

The information processing apparatus 1 can continuously vibrates until the user notices it, as described above.

7. Other Embodiments

In addition to the smartphone described above, the information processing apparatus 1 can be configured by various devices having a microphone function and a vibration function, such as a tablet terminal, a personal computer (PC), and a smart watch. The same functions as those of the information processing apparatus 1 may be realized by a system in which a plurality of devices respectively having the microphone function and the vibration function are connected.

Smartphone, Smart Watch, Smart Speaker

Figure 15:
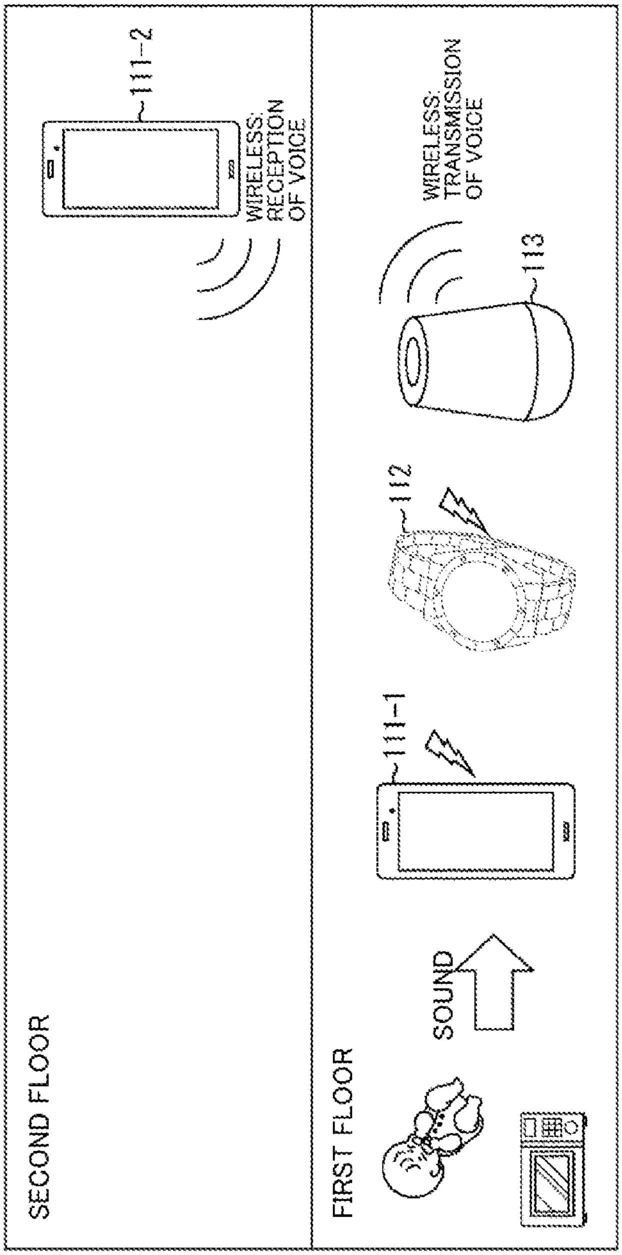
FIG. 15 is a diagram schematically showing an example of a case in which an information processing apparatus is used in a home.

FIG. 15 is a diagram schematically showing an example when the information processing apparatus 1 is used in a house.

As shown on the left side of the lower part of FIG. 15, it is assumed that notification through by a sound of a microwave oven or a sound of crying of a baby is performed on the first floor of the house. In addition, it is assumed that environmental sounds on the first floor of the house do not reach the second floor of the house.

In the example of FIG. 15, a smartphone 111-1, a smart watch 112, and a smart speaker 113 are assumed to be on the first floor of the house. In addition, a smartphone 111-2 is assumed to be on the second floor of the house.

The smartphone 111-1 and the smart watch 112 shown in FIG. 15 have a microphone function and a vibration function. Further, an information processing system is composed of the smart speaker 113 having a microphone function and the smartphone 111-2 having a vibration function.

For example, when the information processing apparatus 1 is configured by the smartphone 111-1, the smartphone 111-1 on the first floor of the house receives environmental sounds of the first floor of the house and vibrates in response to a sound of the microwave oven or a sound of crying of the baby. A user holding the smartphone 111-1 can notice that cooking performed by the microwave oven has completed or the baby is crying by perceiving the vibration of the smartphone 111-1.

When the information processing apparatus 1 is configured by the smart watch 112, the smart watch 112 on the first floor of the house receives the environmental sound of the first floor of the house and vibrates in response to the sound of the microwave oven or the sound of crying of the baby. A user wearing the smart watch 112 can notice that cooking performed by the microwave oven has completed or the baby is crying by perceiving the vibration of the smart watch 112.

When the information processing apparatus 1 is configured by the above-mentioned information processing system, the smart speaker 113 on the first floor of the house receives the environmental sounds of the first floor of the house and transmits sound signals of acquired input sounds to the smartphone 111-2 on the second floor of the house. The smartphone 111-2 receives the sound signals of the input sounds transmitted from the smart speaker 113 and vibrates in response to the sound of the microwave oven or the sound of crying of the baby. A user who is on the second floor of the house and holds the smartphone 111-2 in his/her hand can notice that cooking performed by the microwave oven has completed or the baby is crying on the first floor by perceiving the vibration of the smartphone 111-2.

A vibration signal generated by the smart speaker 113 may be transmitted to the smartphone 111-2. In this case, the smartphone 111-2 vibrates on the basis of the vibration signal transmitted from the smart speaker 113.

Vest Type

The information processing apparatus 1 may be configured as a wearable apparatus having a vest (jacket) shape that can be worn by a user.

Figure 16:
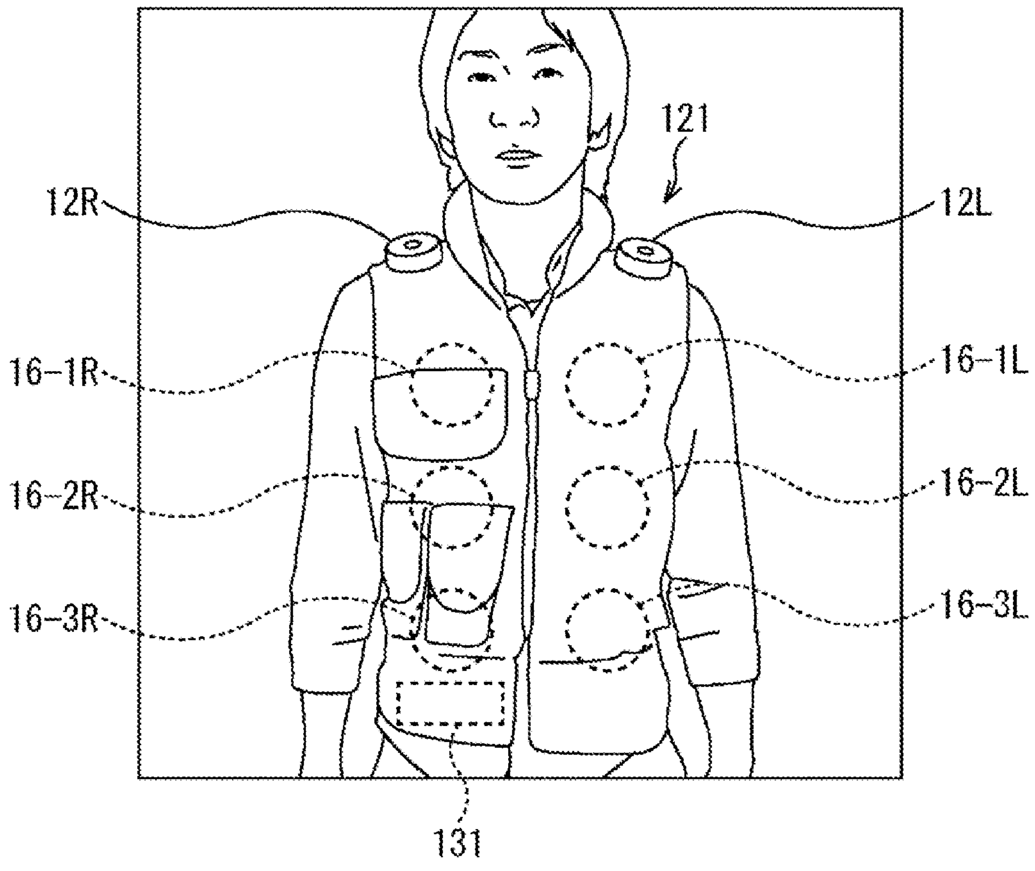
FIG. 16 is a diagram showing a configuration example of the appearance of a wearable apparatus.

FIG. 16 is a diagram showing a configuration example of the appearance of a wearable apparatus.

As shown in FIG. 16, the wearable apparatus 121 is composed of a wearable vest, and as represented by broken lines inside, vibration devices 16-1R to 16-3R and vibration device 16-1L to 16-3L are provided in pairs on the left and right from the chest to the abdomen. The vibration devices 16-1R to 16-3R and the vibration devices 16-1L to 16-3L may vibrate at the same timing or may vibrate at different timings.

In addition, microphones 12R and 12L are provided in pairs on the shoulder of the vest.

A control unit 131 is provided under the vibration device 16-3R. The control unit 131 includes a CPU 11, a DSP/amplifier 15, a battery, and the like. The control unit 131 controls each part of the wearable apparatus 121.

For example, the wearable apparatus 121 is used outdoors such as a stadium where a soccer game or the like is held. The wearable apparatus 121 receives environmental sounds and vibrates in response to cheers of spectators of the game. For example, cheers having sound pressures of a predetermined threshold value or more are set as a target sound. In this case, the wearable apparatus 121 vibrates in response to cheers of spectators only when the cheers of the spectators are loud, such as at the moment when a goal is scored. Since the processing flow executed by the wearable apparatus 121 (control unit 131) is basically the same as the processing flow shown in the flowchart of FIG. 8, description thereof will be omitted.

As described above, a spectator wearing the wearable apparatus 121 can enjoy the heat and presence of spectators in the stadium through vibration in response to the cheers of the spectators. In this case, not only hearing-impaired spectators but also healthy spectators can feel the presence in the stadium more strongly by wearing the wearable apparatus 121. Further, occurrence of howling can be curbed at the time of outputting vibration in response to the cheers of the spectators.

Cushion Type

The information processing apparatus 1 may be configured as a cushion laced on a chair on which a user sits.

Figure 17:
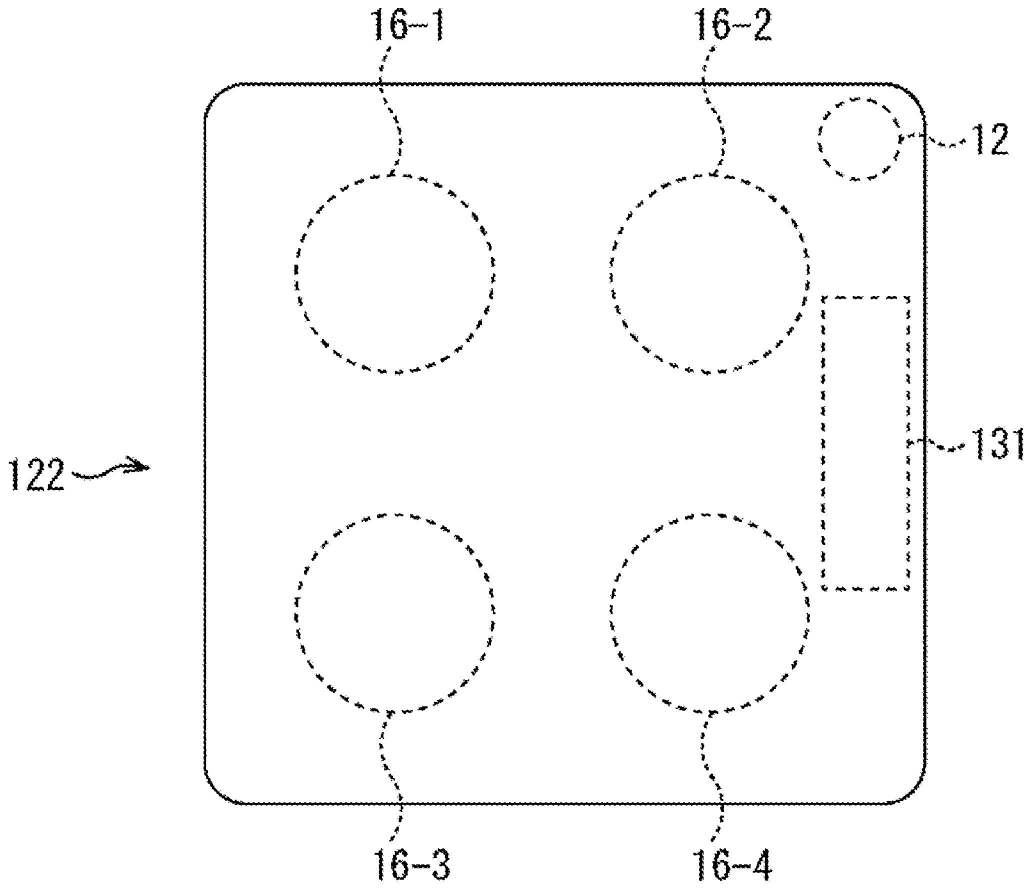
FIG. 17 is a diagram showing a configuration example of the appearance of a cushion viewed from above.

FIG. 17 is a diagram showing a configuration example of the appearance of a cushion viewed from the top.

As shown in FIG. 17, an approximately square cushion 122 is provided with vibration devices 16-1 to 16-4 at four corners inside the cushion 122. The vibration devices 16-1 to 16-4 may vibrate at the same timing or may vibrate at different timings.

In addition, a microphone 12 is provided inside the cushion 122 at the upper right corner.

A control unit 131 is provided on the right side of the cushion 122.

For example, the cushion 122 is also used outdoors such as a stadium where a soccer game is held. The cushion 122 receives environmental sounds and vibrates in response to cheers of spectators of the game. For example, cheers having sound pressures of a predetermined threshold value or more are set as a target sound. In this case, the cushion 122 vibrates in response to cheers of the spectators only when the cheers of the spectators are loud, such as at the moment when a goal is scored. Since the processing flow executed by (the control unit 131 of) the cushion 122 is basically the same as the processing flow shown in the flowchart of FIG. 8, description thereof will be omitted.

As described above, a spectator sitting on a chair on which the cushion 122 is placed can enjoy the heat and presence of spectators in the stadium through vibration in response to cheers of the spectators. In this case, not only hearing-impaired spectators but also healthy spectators can feel the presence in the stadium more strongly by sitting on chairs on which the cushion 122 is placed. Further, howling can be curbed at the time of outputting vibration in response to the cheers of the spectators.

Floor Type (Music Experience)

Figure 18:
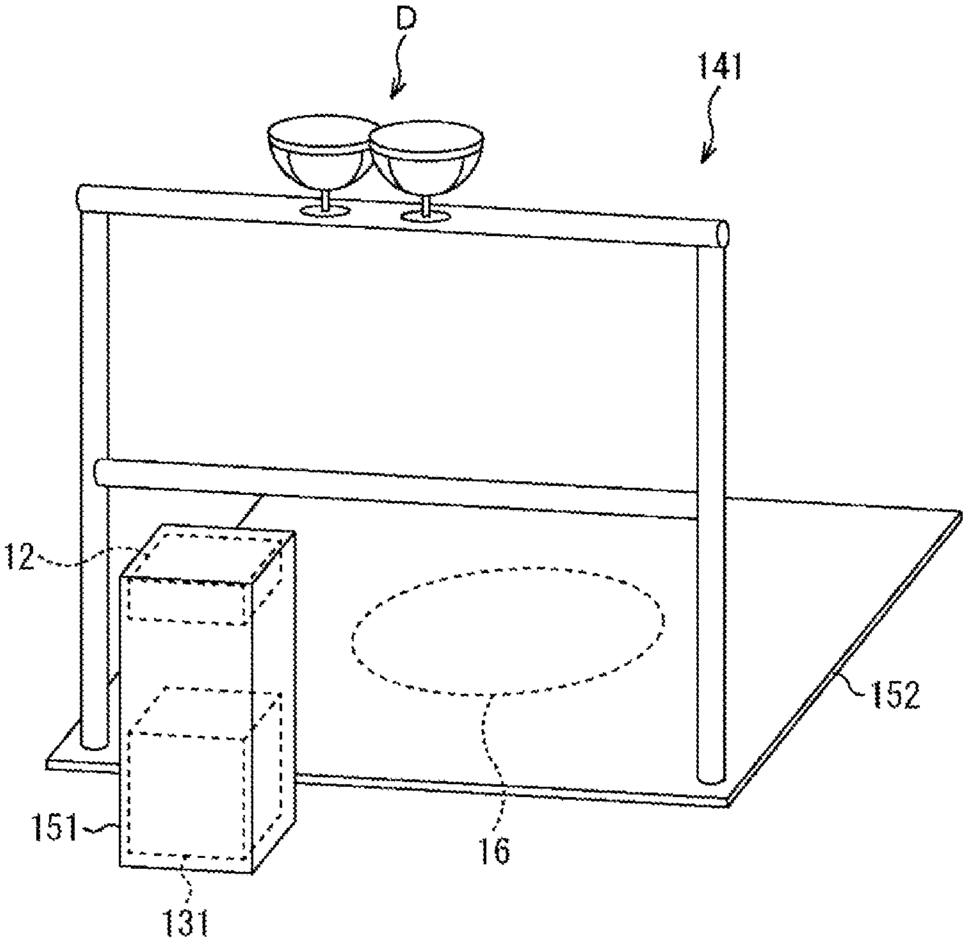
FIG. 18 is a diagram showing a configuration example of the appearance of a music experience apparatus.

FIG. 18 is a diagram showing a configuration example of the appearance of a music experience apparatus.

As shown in FIG. 18, the information processing apparatus 1 may be configured as a music experience apparatus 141 including a control device 151 having a microphone function and a floor 152 having a vibration function.

A user gets on the floor 152 and makes a sound by making a voice or hitting a drum D installed on the floor 152. In the music experience apparatus 141, the voice of the user and the sound of the drum D are set as target sounds.

The control device 151 includes of a microphone 12 and a control unit 131. In FIG. 18, the microphone 12 and the control unit 131 are provided inside the control device 151. The microphone 12 may be provided outside the control device 151.

The control device 151 receives environmental sounds, generates a vibration signal in response to the voice of the user or the sound of the drum D, and supplies the vibration signal to the floor 152.

A vibration device 16 is provided at the center of the floor 152 inside the floor 152. The vibration device 16 vibrates on the basis of the vibration signal supplied from the control device 151. Since the processing flow executed by (the control device 151 of) the music experience apparatus 141 is basically the same as the processing flow shown in the flowchart of FIG. 8, description thereof will be omitted.

The user on the floor 152 can feel the music played by the voice of the user or a person around the user or the sound of the drum D through vibration output from the floor 152. Further, when the floor 152 vibrates in response to music, occurrence of howling can be curbed.

Hardware Configuration of Each Device

Figure 19:
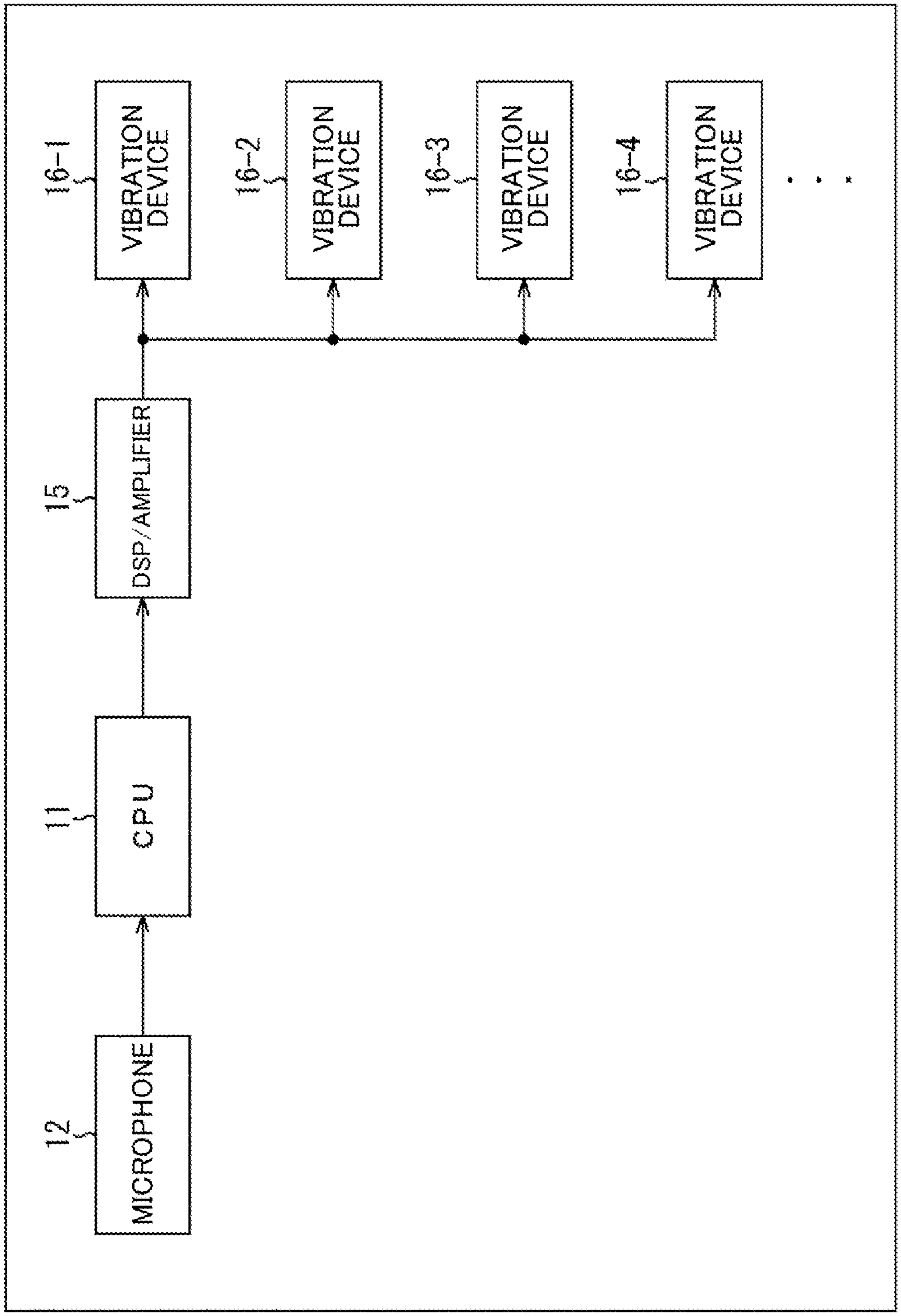
FIG. 19 is a block diagram showing a hardware configuration example of the information processing apparatus.

FIG. 19 is a block diagram showing a hardware configuration example of the information processing apparatus. The wearable apparatus 121, the cushion 122, and the music experience apparatus 141 are all realized by an information processing apparatus having the configuration shown in FIG. 19.

In FIG. 19, the same components as those of the information processing apparatus 1 in FIG. 1 are designated by the same reference numerals. Redundant description will be appropriately omitted.

The signal processing apparatus shown in FIG. 19 is provided with a plurality of vibration devices 16 in addition to the microphone 12, the CPU 11, and the DSP/amplifier 15 described with reference to FIG. 1.

The DSP/amplifier 15 supplies a vibration signal supplied from the CPU 11 to each of the vibration devices 16-1 to 16-4. The vibration signal supplied to the vibration devices 16-1 to 16-4 may be the same vibration signal or different vibration signals. The number of vibration devices 16 provided in the information processing apparatus is not limited to one or four and can be an arbitrary number.

The vibration devices 16-1 to 16-4 vibrate on the basis of the vibration signal supplied from the DSP/amplifier 15.

8. Modified Examples

Although at least some functions of the signal processing unit 32 are realized by the CPU 11 executing a predetermined program in the above description, the signal processing unit 32 may be a signal processing apparatus configured as an integrated circuit such as a large scale integration (LSI) circuit.

Further, the configuration of the signal processing unit 32 described with reference to FIG. 3 or FIG. 6 is an example, and other configurations can be used as long as they can generate a vibration signal representing vibration having a frequency different from the frequency of a target sound included in input sounds.

The above-described series of processing can also be performed by hardware or software. In a case where a series of steps of processing is executed by software, a program constituting the software is installed in a computer embedded into dedicated hardware, a general-purpose personal computer, or the like.

The installed program is provided by being recorded in a removable medium configured as an optical disc (a compact disc-read only memory (CD-ROM), a digital versatile disc (DVD), or the like), a semiconductor memory, or the like. In addition, the program may be provided through a wired or wireless transmission medium such as a local area network, the Internet, or digital broadcast. The program can be installed in a ROM or a storage unit in advance.

Meanwhile, the program executed by the computer may be a program that performs processing chronologically in the order described in the present specification or may be a program that performs processing in parallel or at a necessary timing such as a calling time.

In the present specification, a system means a collection of a plurality of constituent elements (devices, modules (components), or the like) and all the constituent elements may be located or not located in the same casing. Therefore, a plurality of devices contained in separate casings and connected through a network, and one device in which a plurality of modules are contained in one casing, are both systems.

The advantageous effects described in the present specification are merely exemplary and are not intended as limiting, and other advantageous effects may be obtained.

Embodiments of the present technology are not limited to the above-described embodiments, and various modifications can be made without departing from the gist of the present technology.

For example, the present technology can employ a configuration of clouding computing in which a plurality of devices share and process one function together via a network.

In addition, the respective steps described in the above-described flowcharts can be executed by one device or in a shared manner by a plurality of devices.

Furthermore, in a case where a plurality of kinds of processing are included in a single step, the plurality of kinds of processing included in the single step can be executed by one device or by a plurality of devices in a shared manner.

<Example of Combination of Configurations>

The present technology can be configured as follows.

(1)

An information processing apparatus including a signal processing unit configured to generate, at the time of outputting vibration in response to an input sound from the outside, a vibration signal representing the vibration having a frequency different from a frequency of the input sound.

(2)

The information processing apparatus according to (1), wherein the signal processing unit extracts a partial signal, which is a signal in a frequency band corresponding to a target sound that is a sound of a target of the vibration and is included in the input sound, from a sound signal of the input sound, and generates the vibration signal by applying predetermined signal processing to the extracted partial signal.

(3)

The information processing apparatus according to (2), wherein the signal processing includes application of sound pressure change detection processing for extracting an attack sound and lingering detection processing for extracting lingering, and combination of a result of the sound pressure change detection processing and a result of the lingering detection processing.

(4)

The information processing apparatus according to (3), wherein the signal processing includes multiplication of a signal associated with the attack sound of the target sound by the result of the sound pressure change detection processing, and multiplication of a signal associated with the lingering of the target sound by the result of the lingering detection processing.

(5)

The information processing apparatus according to (3), wherein the signal processing includes pitch shift processing for shifting a frequency of the partial signal, and multiplication of a result obtained by combining the result of the sound pressure change detection processing and the result of the lingering detection processing by a result of the pitch shift processing.

(6)

The information processing apparatus according to (5), wherein the pitch shift processing includes processing of shifting the frequency of the partial signal to a frequency that is a fraction of the original frequency.

(7)

The information processing apparatus according to (5) or (6), wherein the signal processing unit determines the target sound included in the input sound on the basis of sound data registered in advance, and extracts the partial signal in the frequency band corresponding to the determined target sound from the sound signal of the input sound.

(8)

The information processing apparatus according to any one of (2) to (7), wherein the target sound includes a sound for notifying the user.

(9)

The information processing apparatus according to any one of (2) to (8), wherein the signal processing unit extracts a signal in a frequency band based on characteristics of a user from the sound signal of the input sound, and extracts the partial signal from the extracted signal.

(10)

The information processing apparatus according to any one of (2) to (9), further including a sound input unit configured to convert the input sound from the outside into a sound signal.

(11)

The information processing apparatus according to any one of (2) to (9), further including a communication unit configured to receive the sound signal of the input sound transmitted from an external device, wherein the signal processing unit extracts the partial signal from the received sound signal of the input sound.

(12)

The information processing apparatus according to any one of (2) to (11), further including a display control unit configured to display information representing the target sound included in the input sound.

(13)

The information processing apparatus according to any one of (2) to (12), wherein the signal processing unit cancels signals in a frequency band of a voice of a user and signals in frequency bands of noises from the sound signal and performs the signal processing.

(14)

The information processing apparatus according to any one of (1) to (13), wherein the signal processing unit analyzes a voice included in the input sound, and generates the vibration signal on the basis of a result of the analysis.

(15)

The information processing apparatus according to any one of (1) to (14), further including a control unit configured to cause a vibration device to output the vibration represented by the vibration signal.

(16)

The information processing apparatus according to (15), wherein the control unit stops output of the vibration according to a user operation.

(17)

The information processing apparatus according to (15) or (16), wherein a plurality of the vibration devices are provided.

(18)

The information processing apparatus according to any one of (1) to (17), wherein the signal processing unit generates a vibration signal corresponding to an input sound having a sound pressure equal to or greater than a threshold value.

(19)

An information processing method performed by an information processing apparatus, including at the time of outputting vibration in response to an input sound from the outside, generating a vibration signal representing the vibration having a frequency different from a frequency of the input sound.

(20)

A program causing a computer to execute processing of, at the time of outputting vibration in response to an input sound from the outside, generating a vibration signal representing the vibration having a frequency different from a frequency of the input sound.

REFERENCE SIGNS LIST

1 Information processing apparatus
11 CPU
12 Microphone
13 Communication unit
14 Storage unit
15 DSP/amplifier
16 Vibration device
17 Speaker/external output unit
18 GPU
19 Display
31 Sound input unit
32 Signal processing unit
33 Waveform storage unit
34 Vibration control unit
35 Display control unit
51, 52*a*, 52*b* Bandpass filter
53 Vibration signal generation unit
111-1, 111-2 Smartphone
112 Smart watch
113 Smart speaker

121 Wearable apparatus
122 Cushion
131 Control unit
141 Music experience apparatus
151 Control device

The invention claimed is:

1. An information processing apparatus, comprising:
a central processing unit (CPU) configured to:
receive an input sound that includes a target sound, wherein the target sound is a sound of a target of vibration;
extract, from a sound signal of the input sound, a partial signal which is a signal in a frequency band corresponding to the target sound;
apply a signal processing operation to the extracted partial signal, wherein the signal processing operation is applied to:
apply a sound pressure change detection processing operation to extract an attack sound signal,
apply a lingering detection processing operation to extract a lingering signal,
combine a first result of the sound pressure change detection processing operation and a second result of the lingering detection processing operation,
execute a pitch shift processing operation to shift a frequency of the extracted partial signal, and
multiply a third result of the pitch shift processing operation with a fourth result of the combination of the first result and the second result; and
generate, based on the application of the signal processing operation, a vibration signal representing the vibration having a frequency different from a frequency of the input sound, wherein
the vibration signal is generated at a time of output of the vibration, and
the vibration is outputted in response to the received input sound.

2. The information processing apparatus according to claim 1, wherein the signal processing operation is applied further to:
multiply a signal associated with the attack sound signal of the target sound with the first result of the sound pressure change detection processing operation, and
multiply a signal associated with the lingering signal of the target sound with the second result of the lingering detection processing operation.

3. The information processing apparatus according to claim 1, wherein the pitch shift processing operation is executed to shift the frequency of the partial signal to a frequency that is a fraction of the original frequency of the input sound.

4. The information processing apparatus according to claim 1, wherein the CPU is further configured to:
determine the target sound included in the input sound based on sound data registered in advance; and
extract the partial signal in the frequency band corresponding to the determined target sound from the sound signal of the input sound.

5. The information processing apparatus according to claim 1, wherein the target sound includes a sound to notify a user.

6. The information processing apparatus according to claim 1, wherein the CPU is further configured to:
extract, from the sound signal of the input sound, a signal in a frequency band based on characteristics of a user; and
extract the partial signal from the extracted signal.

7. The information processing apparatus according to claim 1, wherein the CPU is further configured to convert the received input sound into the sound signal.

8. The information processing apparatus according to claim 1, wherein the CPU is further configured to:
receive the sound signal of the input sound transmitted from an external device; and
extract the partial signal from the received sound signal of the input sound.

9. The information processing apparatus according to claim 1, wherein the CPU is further configured to control a display to display information representing the target sound.

10. The information processing apparatus according to claim 1, wherein the CPU is further configured to:
cancel, from the sound signal, signals in a frequency band of a voice of a user and signals in frequency bands of noises; and
apply, based on the cancellation, the signal processing operation.

11. The information processing apparatus according to claim 1, wherein the CPU is further configured to:
analyze a voice in the input sound; and
generate the vibration signal based on a fifth result of the analysis.

12. The information processing apparatus according to claim 1, wherein the CPU is further configured to control a vibration device to output the vibration represented by the vibration signal.

13. The information processing apparatus according to claim 12, wherein the CPU is further configured to stop, based on a user operation, the output of the vibration.

14. The information processing apparatus according to claim 12, further comprising a plurality of vibration devices, wherein the plurality of vibration devices includes the vibration device.

15. The information processing apparatus according to claim 1, wherein the CPU is further configured to generate a vibration signal corresponding to an input sound having a sound pressure equal to or greater than a threshold value.

16. An information processing method, comprising:
in an information processing apparatus:
receiving an input sound that includes a target sound, wherein the target sound is a sound of a target of vibration;
extracting, from a sound signal of the input sound, a partial signal which is a signal in a frequency band corresponding to the target sound;
applying a signal processing operation to the extracted partial signal, wherein the signal processing operation is applied for:
applying a sound pressure change detection processing operation to extract an attack sound signal,
applying a lingering detection processing operation to extract a lingering signal,
combining a first result of the sound pressure change detection processing operation and a second result of the lingering detection processing operation,
executing a pitch shift processing operation to shift a frequency of the extracted partial signal, and
multiplying a third result of the pitch shift processing operation with a fourth result of the combination of the first result and the second result; and
generating, based on the application of the signal processing operation, a vibration signal representing the vibration having a frequency different from a frequency of the input sound, wherein the vibration signal is generated at a time of output of the vibration, and the vibration is outputted in response to the received input sound.

17. A non-transitory computer-readable medium having stored thereon, computer-executable instructions which, when executed by a computer, cause the computer to execute operations, the operations comprising:

receiving an input sound that includes a target sound, wherein the target sound is a sound of a target of vibration;

extracting, from a sound signal of the input sound, a partial signal which is a signal in a frequency band corresponding to the target sound;

applying a signal processing operation to the extracted partial signal, wherein the signal processing operation is applied for:

applying a sound pressure change detection processing operation to extract an attack sound signal, applying a lingering detection processing operation to extract a lingering signal, combining a first result of the sound pressure change detection processing operation and a second result of the lingering detection processing operation, executing a pitch shift processing operation to shift a frequency of the extracted partial signal, and multiplying a third result of the pitch shift processing operation with a fourth result of the combination of the first result and the second result; and generating, based on the application of the signal processing operation, a vibration signal representing the vibration having a frequency different from a frequency of the input sound, wherein the vibration signal is generated at a time of output of the vibration, and the vibration is outputted in response to the received input sound.

* * * * *